(12) United States Patent
Fehrenbach et al.

(10) Patent No.: US 12,101,806 B2
(45) Date of Patent: Sep. 24, 2024

(54) NR-U WIDEBAND ENHANCEMENTS

(71) Applicant: KONINKILIJKE PHILIPS N.V., Eindhoven (NL)

(72) Inventors: Thomas Fehrenbach, Berlin (DE); Baris Goektepe, Berlin (DE); Cornelius Hellge, Berlin (DE); Thomas Wirth, Berlin (DE); Thomas Schierl, Berlin (DE); Khaled Shawky Hassan Hussein, Erlangen (DE); Martin Leyh, Erlangen (DE); Thomas Heyn, Erlangen (DE); Bernhard Niemann, Erlangen (DE); Julian Popp, Erlangen (DE)

(73) Assignee: Koninklijke Philips N.V., Eindhoven (NL)

( * ) Notice: Subject to any disclaimer, the term of this patent is extended or adjusted under 35 U.S.C. 154(b) by 316 days.

(21) Appl. No.: 17/491,130

(22) Filed: Sep. 30, 2021

(65) Prior Publication Data

US 2022/0061090 A1 Feb. 24, 2022

Related U.S. Application Data

(63) Continuation of application No. PCT/EP2020/059523, filed on Apr. 3, 2020.

(30) Foreign Application Priority Data

Apr. 5, 2019 (EP) .................................... 19167704
Apr. 23, 2019 (EP) .................................... 19170688

(51) Int. Cl.
*H04W 74/0808* (2024.01)
*H04W 72/20* (2023.01)
(Continued)

(52) U.S. Cl.
CPC ....... *H04W 74/0808* (2013.01); *H04W 72/20* (2023.01); *H04W 72/21* (2023.01);
(Continued)

(58) Field of Classification Search
CPC ........... H04W 74/0808; H04W 74/006; H04W 72/20; H04W 72/21; H04W 72/23; H04W 74/002
See application file for complete search history.

(56) References Cited

U.S. PATENT DOCUMENTS

2017/0202021 A1* 7/2017 Lee .................. H04L 5/001
2018/0367282 A1* 12/2018 Li .................. H04W 72/1268
(Continued)

FOREIGN PATENT DOCUMENTS

WO 2018085150 A1 5/2018

OTHER PUBLICATIONS

3GPP, "3GPP TSG RAN meeting #67", RP-150271, 3GPP RAN #67, "Status Report to TSG: Study on Licensed-Assisted Access to Unlicensed Spectrum"; Mar. 2015, 8 pp., Mar. 2015.
(Continued)

*Primary Examiner* — Mounir Moutaouakil

(57) ABSTRACT

An apparatus, for wideband communication with one or more transceivers in a wireless communication system using one or more subbands of a predefined wideband, is configured to perform initial Listen-Before-Talk, LBT, for each subband of the predefined wideband so as to determine from the predefined wideband one or more non-occupied subbands on which the wideband communication is allowed during a certain transmission time, and during the certain transmission time, transmit to and/or receive from the transceiver using the non-occupied subbands. During the certain transmission time and in case the initial LBT indicted that one or more of the subbands are occupied, the apparatus is
(Continued)

configured to perform a further LBT for the one or more occupied subbands so as to determine one or more of the initially occupied subbands being no longer occupied, and transmit to and/or receive from the transceiver using, in addition to the initially non-occupied subbands, the one or more no longer occupied subbands.

21 Claims, 16 Drawing Sheets

(51) Int. Cl.
  *H04W 72/21* (2023.01)
  *H04W 72/23* (2023.01)
  *H04W 74/00* (2009.01)
(52) U.S. Cl.
  CPC ......... *H04W 72/23* (2023.01); *H04W 74/002* (2013.01); *H04W 74/006* (2013.01)

(56) References Cited

U.S. PATENT DOCUMENTS

| | | | |
|---|---|---|---|
| 2021/0092772 A1* | 3/2021 | Nakashima | H04L 5/001 |
| 2021/0153245 A1* | 5/2021 | Tooher | H04W 74/008 |
| 2021/0168862 A1* | 6/2021 | Murray | H04W 74/002 |

OTHER PUBLICATIONS

Cisco, "Enterprise Mobility 4.1 Design Guide", Enterprise Mobility 4.1 Design Guide—Cisco Unified Wireless QoS (Design Zone for Mobility)—Cisco, Nov. 29, 2021, https://www.cisco.com/c/en/us/td/docs/solutions/Enterprise/Mobility/emob41dg/emob41dg-wrapper/ch5_QoS.html#wp1021972, 35 pp.The Wayback Machine—https://web.archive.org/web/20170801113344/http://www.cisco.co, Nov. 29, 2021.

Dharmadhikari, Omkar, et al., "5G Link Aggregation with Multipath TCP (MPTCP)", O. Dharmadhikari et al., https://www.cablelabs.com/5g-link-aggregation-mptcp, 18 pp.

ETRI, "3GPP TSG RAN WG1 Meeting #96bis", ETRI, "Wideband operation of NR-U", 3GPP Draft; R1-1904604—Final, Mobile Competence Centre; 650, Route des Lucioles; F-06921 Sophia-Antipolis Cedex; France, vol. RAN WG1, No. Xi'an, China; Apr. 8, 2019-Apr. 12, 2019, Mar. 29, 2019, XP051691633, 4 pp., Mar. 2019.

ETSI , "[Uploaded in 8 parts] ETSI EN 301 893 V1.7.1 (Jun. 2012)", ETSI EN 301 893 V1.7.1 (Jun. 2012), https://www.etsi.org/deliver/etsi_en/301800_301899/301893/01.07.01_60/en_301893v010701p, pdf, 90 pp. Jun. 2012.

Ilmenau University of Technology, "IEEE 802.11", IEE 802.11, Ilmenau University of Technology, https://www.tu-ilmenau.de/fileadmin/public/iks/files/lehre/mobicom/AN-10-IEE_802_11.pdf, 35 pp.Integrated Communication Systems Group, 2016.

Intel, "Wideband operation for NR-unlicensed", Intel Corp., "Wideband operation for NR-unlicensed", 3GPP Draft; R1-1904289—Intel—Wideband, Mobile Competence Centre; 650, Route des Lucioles; F-06921 Sophia-Antipolis Cedex; France, vol. RAN WG1, No. Xi'an, China; 6 pp.Apr. 8, 2019-Apr. 12, 2019, Mar. 30, 2019, XP051691414, Apr. 2019.

Panasonic, "Wideband operation in NR unlicensed", Panasonic, "Wideband operation in NR unlicensed", 3GPP Draft; R1-1904165, Mobile Competence Centre; 650, Route des Lucioles; F-06921 Sophia-Antipolis Cedex; France, vol. RAN WG1, No. Xi'an, China; Apr. 8, 2019-Apr. 12, 2019, Mar. 29, 2019, XP051691309, 4 pp., Apr. 2019.

\* cited by examiner

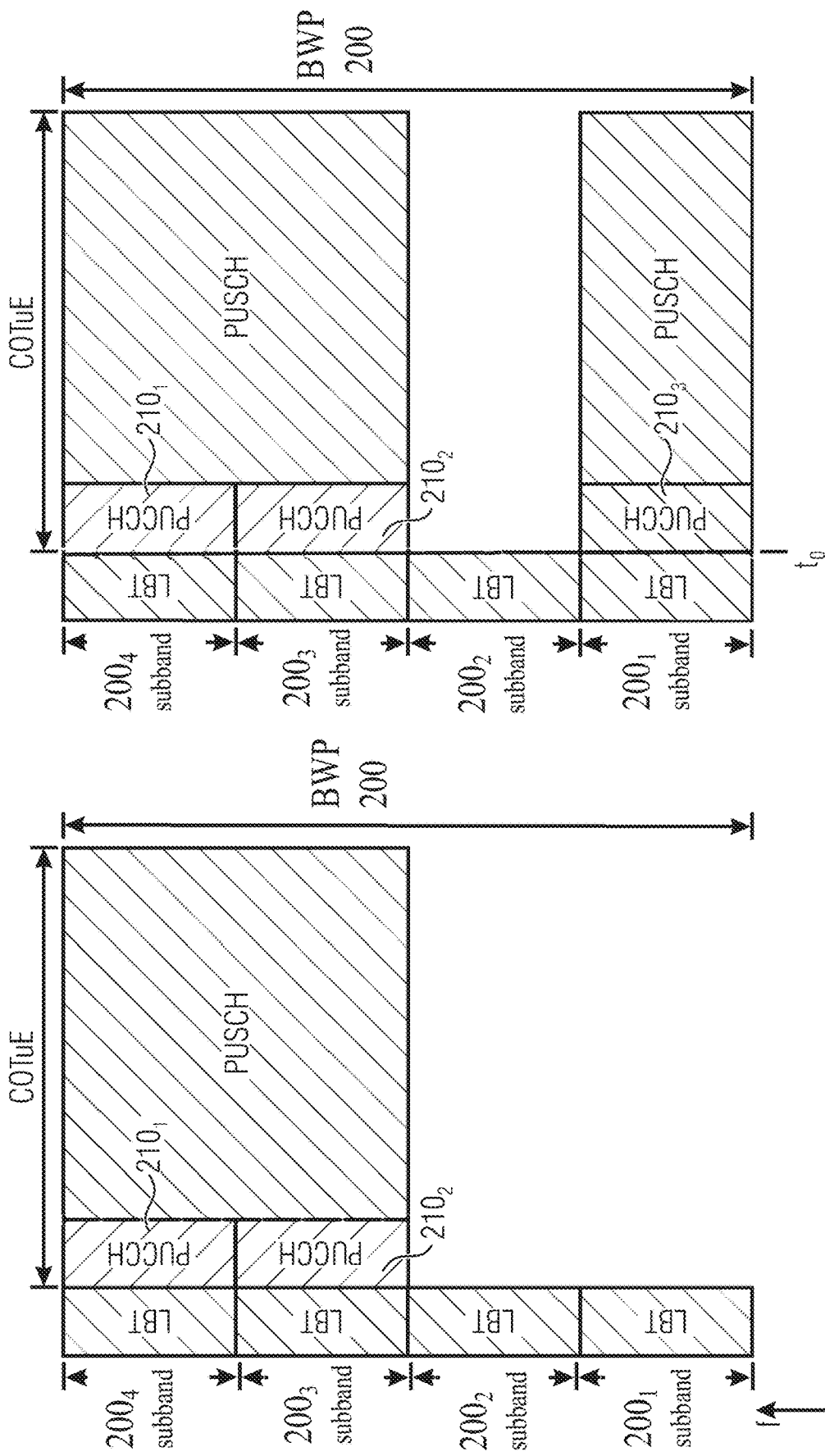

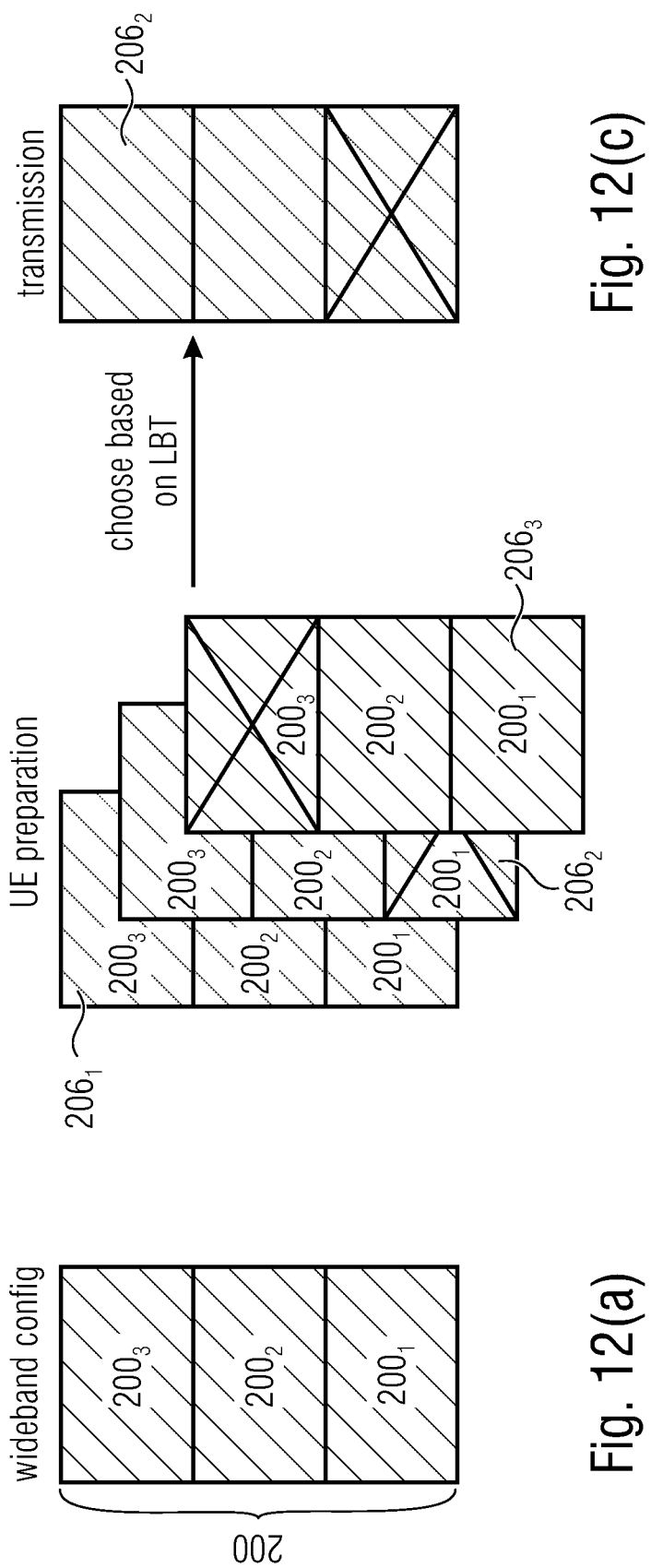

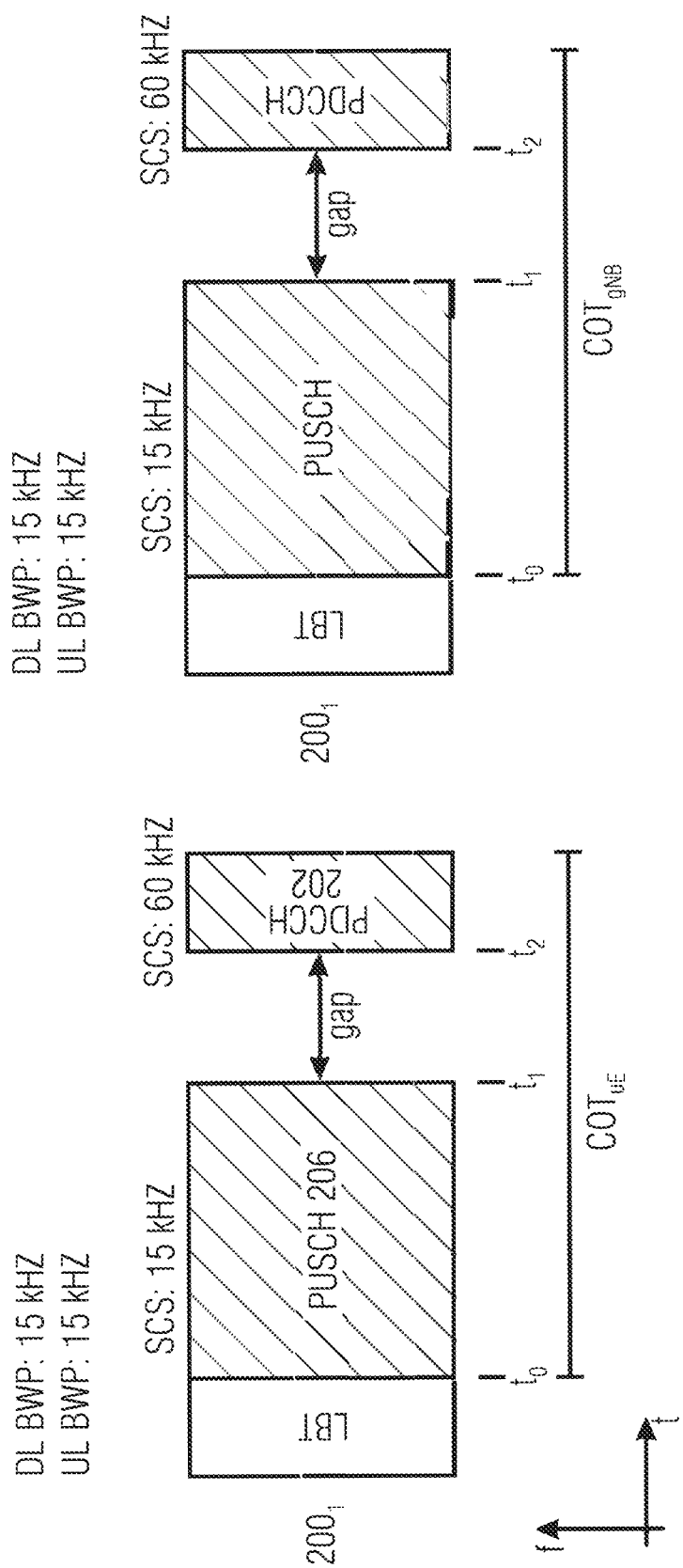

NR-U WIDEBAND ENHANCEMENTS

CROSS-REFERENCES TO RELATED APPLICATIONS

This application is a continuation of copending International Application No. PCT/EP2020/059523, filed Apr. 3, 2020, which is incorporated herein by reference in its entirety, and additionally claims priority from European Applications Nos. EP 19167704.6, filed Apr. 5, 2019, and EP 19170688.6, filed Apr. 23, 2019, which are incorporated herein by reference in their entirety.

The present application relates to the field of wireless communication systems or networks, more specifically to approaches for a wireless communication among entities of a wireless communication system using a wideband operation. Embodiments concern NR-U wideband enhancements.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, .... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user UEs as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication systems or networks, like those described above with reference to FIG. 1, for example in a LTE or 5G/NR network, the respective entities may communicate using a wideband operation. In a wideband operation, for example, the base station, gNB, and/or the user device, UE, may transmit on multiple subbands. The subbands may have different bandwidths or the same bandwidth, like 20 MHz. The gNB and UE, for the wideband operation, perform listen-before-talk, LBT, separately per subband which may lead to a situation that one or more of the subbands to be used for the wideband operation, also referred to as a subset of the subbands, is busy or occupied due to a transmission or interference by one or more other public land mobile networks, PLMNs, or by one or more other communication systems coexisting on the same frequency band, for example systems operating in accordance with the IEEE 802.11 specification.

It is noted that the information in the above section is only for enhancing the understanding of the background of the invention and therefore it may contain information that does not form conventional technology that is already known to a person of ordinary skill in the art.

Starting from conventional technology as described above, there may be a need for improvements in the wireless communication among entities of a wireless communication system using a wideband operation.

BRIEF DESCRIPTION OF THE DRAWINGS

Embodiments of the present invention will be detailed subsequently referring to the appended drawings, in which:

FIGS. 4a-b FIG. 4 schematically illustrates a wideband operation for NR-U, wherein FIG. 4 (a) illustrates a downlink wideband transmission, for example, by a gNB, and FIG. 4 (b) shows an embodiment for transmitting in the uplink, for example by a UE;

FIGS. 10a-d illustrates embodiments of a second aspect of the present invention for reporting the LBT outcome in an uplink signaling;

FIGS. 12a-c illustrates an embodiment in which a UE prepares three different PUSCHs sizes and chooses one based on the LBT outcome;

FIGS. 14a-b illustrates embodiments of a seventh aspect in accordance with an operation for quickly transmitting, responsive to receiving a transmission, information on a single subband that may be shared among different communication systems.

DETAILED DESCRIPTION OF THE INVENTION

Embodiments of the present invention are now described in more detail with reference to the accompanying drawings in which the same or similar elements have the same reference signs assigned.

As mentioned above, in wireless communication systems or networks, like those described above with reference to FIG. 1, the respective entities may communicate using a wideband operation in which, for example, the gNB as well as the UE may transmit on multiple subbands, for example on multiple subbands having different bandwidths or the same bandwidth, like 20 MHz. Listen-before-talk, LBT, is to be performed separately per subband and may lead to a situation in which one or more of the subbands is busy or occupied due to an interference, for example, from other communication systems coexisting on the same band, like other public land mobile networks, PLMNs or systems operating in accordance with the IEEE 802.11 specification. In such a situation, the transmitter, namely either the transmitting gNB or the transmitting UE, is only allowed to transmit on the subbands which are detected to be not busy, also referred to as subbands being free or non-occupied, as is determined by the LBT algorithm. In such a case, the receiver, e.g., a UE, may waste energy by blind decoding not only over all the free or non-occupied subbands, which may also be referred to as won subbands, but also over the busy or occupied subbands, which may be referred to in the following also as the non-won subbands.

Also the spectral efficiency may decrease, since the channel occupancy during the LBT of the transmitter, like the gNB, may only be of short duration. For example, there may be a short WiFi transmission at the time the gNB performs the LBT which only occupies a part of the transmission time allocated for this transmission, like only a portion of a frame, so that the major part of the frame is unused thereby reducing the spectral efficiency.

Figure 2:
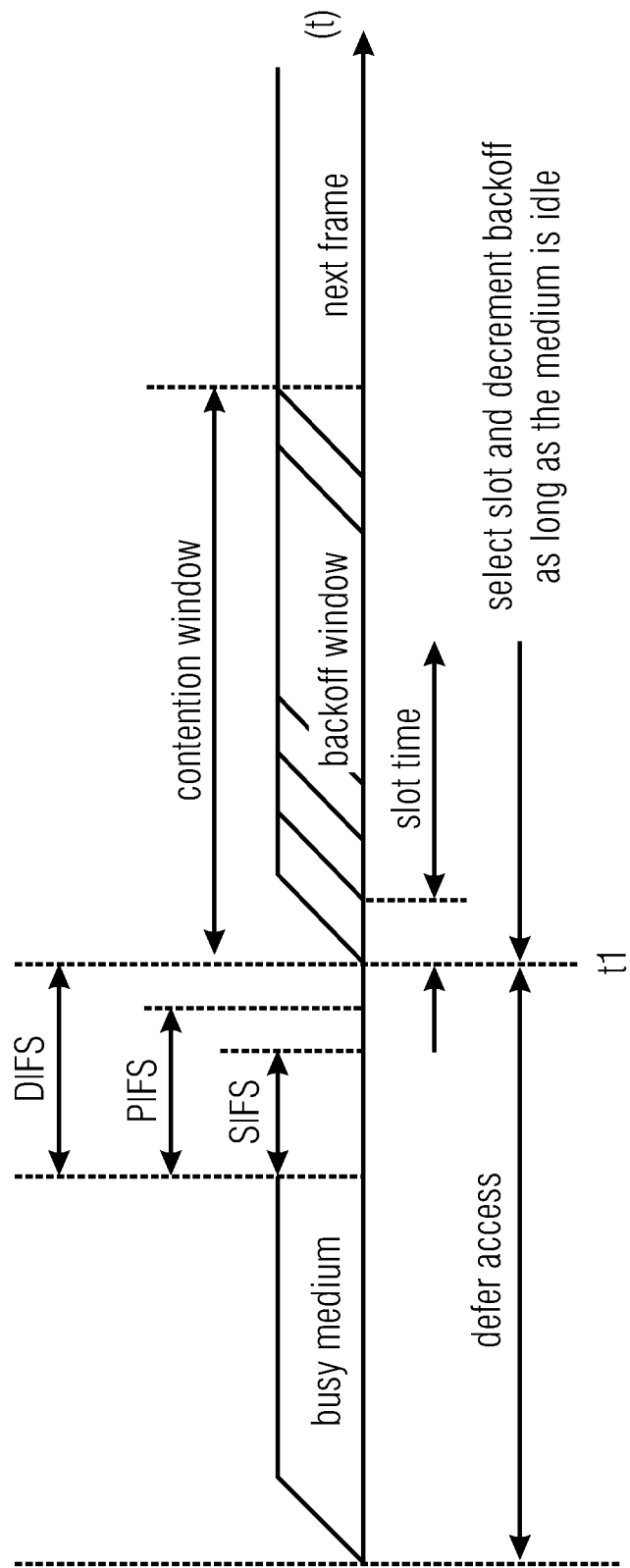
FIG. 2 FIG. 2 illustrates the distributed coordination function, as used in accordance with the IEEE 802.11 specification.

As an example, a situation is now considered in which a subset of the subbands is busy or occupied due to interference by systems operating according to the IEEE 802.11 specification. FIG. 2 illustrates the distributed coordination function, as used in accordance with the IEEE 802.11 specification, more specifically, the interframe spaces, the backoff window and the contention window used by the CSMA/CL algorithm of IEEE 802.11 systems, which is described in more detail in:

[1] https://www.cisco.com/c/en/us/td/docs/solutions/Enterprise/Mobility/emob41dg/emob41dg-wrapper/ch5 QoS.html #wp1021972,

[2] https://www.tu-ilmenau.de/fileadmin/public/iks/files/lehre/mobicom/AN-10-IEEE_802_11.pdf As is shown in FIG. 2, data frames in accordance with the IEEE 802.11 specification are sent using the DCF, which is composed of the following two main components:
- interframe spaces, SIFS, PIFS and DIFS depicted in FIG. 2, and
- random backoff (contention window) DCF to manage access to RF medium.

The three interframe spaces comprise the short interframe space, SIFS, having a duration of typically 10 µs, the point coordination function, PCF, interframe space, PIFS, which is composed of the SCIFS plus 1× slot time which amounts typically to 30 µs, and the DCF interframe space, DIFS, which is composed of the SCIFS plus 2× the slot time of 10 µs so that it amounts typically to 50 µs. The interframe spaces SCIFS, PIFS and DIFS are provided to control which traffic gets first access to the channel after carrier sensing declares the channel to be free, wherein management frames and those frames not expecting contention, like a frame that is part of a sequence of frames, uses SIFS, while data frames use DIFS. In FIG. 2 a situation is illustrated in which, initially, a channel is found to be busy or occupied so that access is deferred until $t_1$ with the appropriate interframe spaces applied. For example, when a data frame using DCF is ready to be sent, a random backoff number between zero and a minimum contention window is generated, and once the channel is free for the DIFS interval the random backoff number begins to be decremented for every slot time, like 20 µs, that the channel remains free. In case the channel becomes busy during that time, for example, because another station's random backoff number is getting to zero before the one of the current station, the decrement stops and the steps are repeated. On the other hand, in case the channel, during the decrementing of the random backoff number remains free until the number reaches zero, the frame is sent, as is indicated at the right hand side in FIG. 2.

Figure 3:
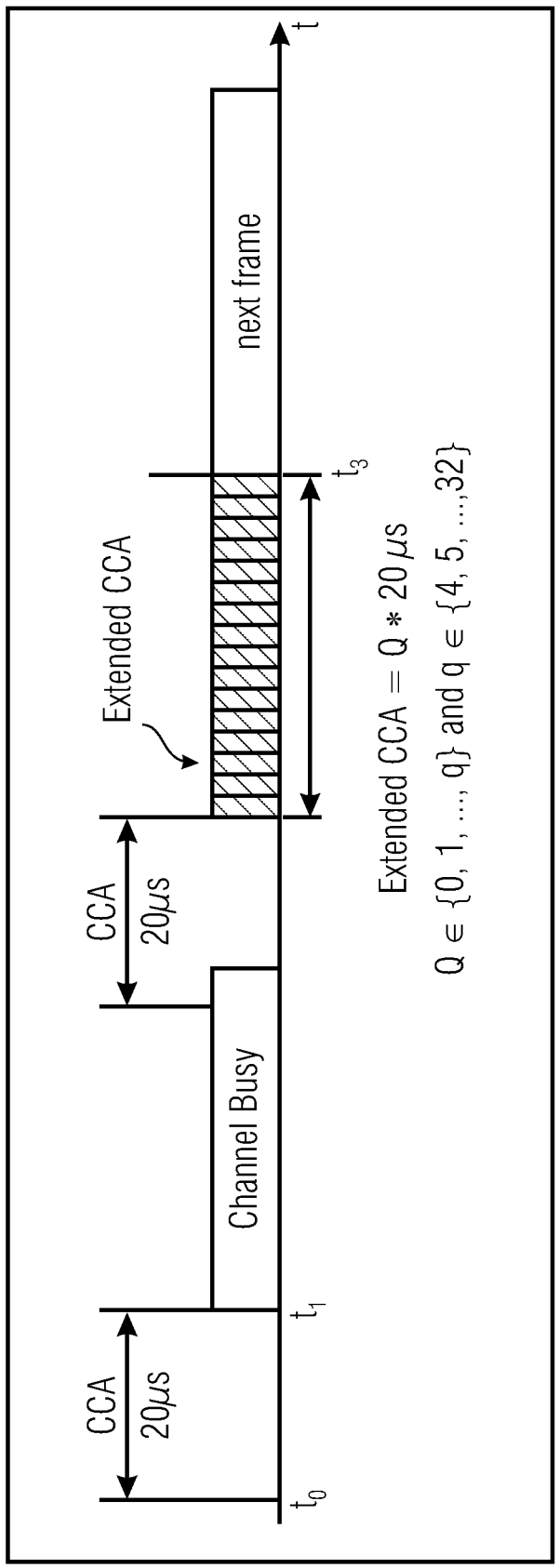
FIG. 3 FIG. 3 illustrates an LBT based spectrum sharing mechanism based on the CCA mode.

Reference [3] (https://www.etsi.org/deliver/etsi_en/301800_301899/301893/01.07.01_60/en_301893v010701p.pdf) describes a high performance wireless access system including radio local area network equipment which is used in wireless local area networks. Such networks provide high speed data communications in between devices connected to the wireless infrastructure, and ad-hoc networking is described to allow the devices to communicate directly with each other. In such systems load based equipment may implement an LBT based spectrum sharing mechanism based on the clear channel assessment, CAA, mode using energy detect as described in IEEE 802.11. FIG. 3 illustrates an LBT based spectrum sharing mechanism based on the CCA mode. Before a transmission or a burst of transmissions on a channel, the equipment performs a CCA check using energy detect, and the equipment observes the channel for the CCA observation time which may be not less than 20 µs. This is illustrated in the left hand part of FIG. 3 where at a time $t_0$ the CCA observation time starts. The end of the CCA observation time is $t_1$. In the depicted example, the channel is considered to be occupied or busy because the energy level detected in the channel exceeds a threshold and, accordingly, the equipment does not transmit. Since the equipment found an occupied channel, i.e., since there is not any transmission at this time, the equipment performs an extended CCA during which the channel is observed for a duration of a random factor N multiplied by the CCA observation time. N defines the number of clear idle slots resulting in total idle period that needs to be observed before initiating the transmission. The value N is stored in a counter which is decremented every time a CCA slot is considered to be free or non-occupied and once the counter reaches zero, the equipment may transmit, as indicated at $t_2$ in FIG. 3.

For example, the 5G New Radio (NR) technology supports operation in unlicensed bands through a technology referred to as NR-based access to unlicensed spectrum (NR-U). The unlicensed spectrum may include bands, e.g., with potential IEEE 802.11 coexistence, such as the 5 GHz and the 6 GHz bands. NR-U may support bandwidths that are an integer multiple of 20 MHZ, for example due to regulatory requirements. Each of the 20 MHz bandwidth channels is designed as a subband, and the splitting into the subbands is performed so as to minimize interference with coexisting systems, like IEE 802.11 systems, which may operate in one or more of the same bands with the same nominal bandwidth channels, like 20 MHz channels. Other examples, of coexisting systems may use frequency bands having subband sizes and nominal frequencies different from the above-described IEEE 802.11 systems. For example, unlicensed frequency bands may be used, for example, the 24 GHz band or the 60 GHz band. Examples of such unlicensed frequency bands include the industrial, scientific and medical, ISM, radio bands reserved internationally for the use of radio frequency energy for industrial, scientific and medical purposes other than telecommunications.

In general, during a wideband operation, for example a transmission spanning more than 20 MHz in the 5 GHz operational unlicensed band, the transmitter, like the gNB or the UE perform LBT separately on each subband, and once the LBT results are available for each subband, the devices, for example, the gNB in the downlink, DL, or the UE in the uplink, UL, are allowed to only transmit on those subbands which are determined to be free or unoccupied, i.e., to transmit on the won subband. For example, in the 5 GHz unlicensed band, the number of 20 MHz subbands used for a wideband operation may be four, so that the overall bandwidth is 80 MHz, however, the number of actually used subbands may differ.

Figure 4:
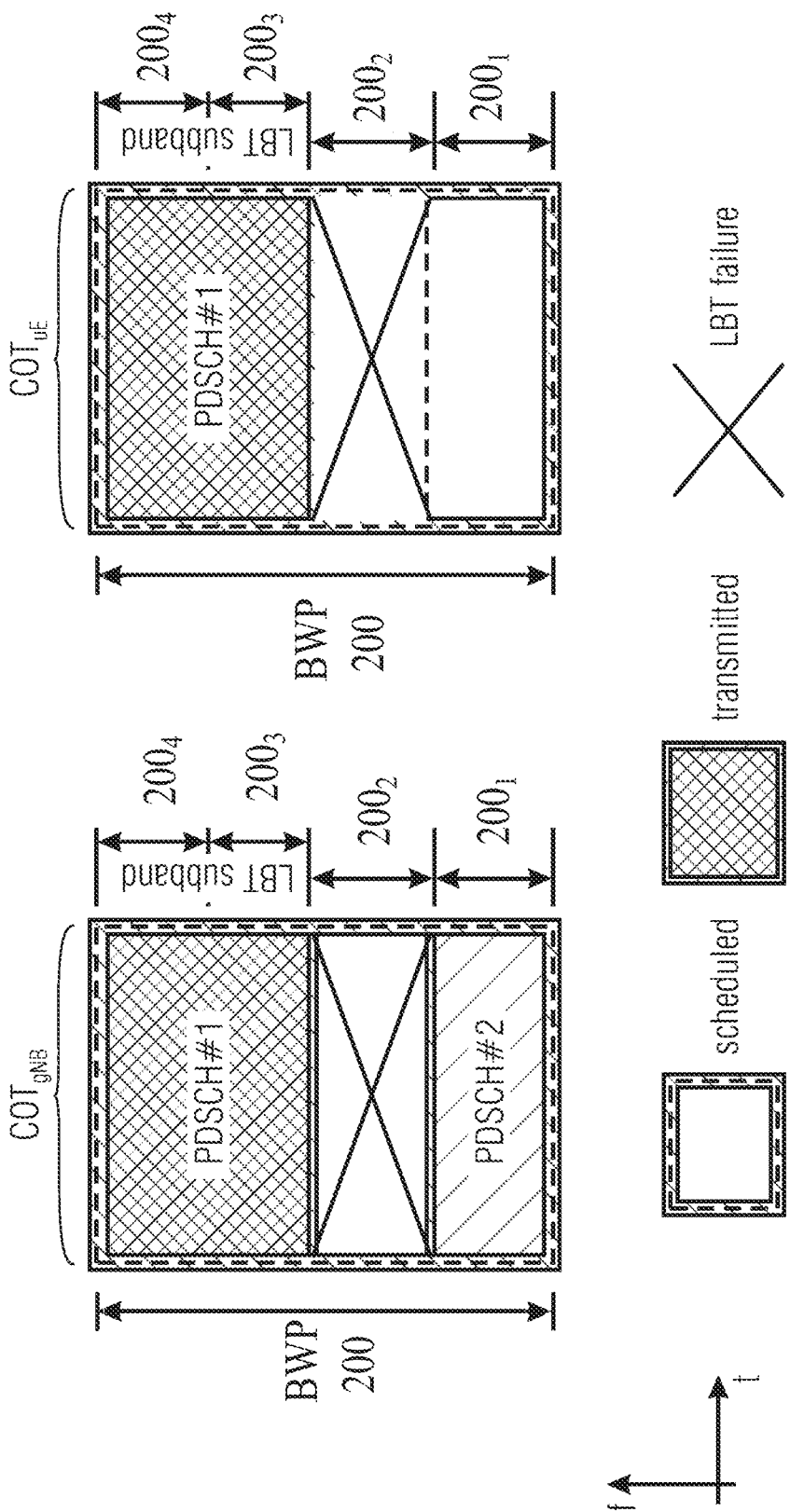

FIG. 4 schematically illustrates a wideband operation for NR-U as described above. For such a wideband operation a certain wideband configuration may be employed which specifies the overall bandwidth for the wideband operation, the number of subbands, the respective bandwidths of the subbands, the duration, like the number of symbols, of the wideband operation over time, also referred to as the channel occupancy time, COT. In the system one or more such wideband configurations may exist. In cases there are multiple wideband configurations the transmitter may select the wideband configuration to be used from the plurality of available wideband configurations.

FIG. 4 (a) illustrates a downlink wideband transmission, for example, by a gNB. In accordance with the wideband configuration to be used, a bandwidth part, BWP, 200 may be scheduled, i.e., within the available resources the BWP 200 defines a number of subcarriers to be used for the wideband operation. For example, the BWP 200 may have an overall bandwidth of 80 MHZ, and the respective subbands, also referred to as LBT subbands $200_1$ to $200_4$ have a bandwidth of 20 MHz each. The gNB, prior to performing the transmission in the downlink, performs for each subband $200_1$ to $200_4$ LBT so as to determine whether the respective subband is busy/occupied or free/non-occupied. In the example depicted in FIG. 4 (a) the LBT performed by the gNB yields that subbands $200_1$, $200_3$ and $200_4$ are free, while subband $200_2$ is busy. Thus, for the wideband operation within the BWP 200 the gNB won the subbands $200_1$, $200_3$ and $200_4$ for the transmission, while subband $200_2$ is not won. Subband $200_2$ may not be available due to a transmission from a coexisting system, like the above-described IEEE 802.11 system. This is indicated in FIG. 4 by x indicating the LBT failure. Responsive to the LBT algorithm performed, the gNB selects subbands $200_1$, $200_3$ and $200_4$ for transmitting data in the downlink as is indicated by PDSCH #1 and PDSCH #2.

FIG. 4 (b) shows an embodiment for transmitting in the uplink, for example by a UE. According to the wideband configuration to be used a BWP 200 is scheduled for the broadband operation of the UE, for example an 80 MHz wideband operation using again the four LBT subbands $200_1$ to $200_4$. The UE, initially, performs an LBT which yields that among the LBT subbands, the subband $200_2$ is busy or not free and, therefore, may not be used by the UE. In addition, it is assumed that the UE prefers to transmit in the uplink only in continuous/adjacent subbands, so that the UE in the example of FIG. 4 (b) selects subbands $200_3$ and $200_4$ which, in accordance with the LBT algorithm, are free for transmitting in the uplink as is indicated by PUSCH #1. No transmission in the subband $200_1$ occurs, however, in case also a non-continuous transmission is possible or desired, additional data may be transmitted in subband $200_1$ which is also available.

As is described, for example, in RP-150271, "Status Report to TSG: Study on Licensed-Assisted Access to Unlicensed Spectrum," 3GPP RAN #67, March 2015), the LBT schemes in 3GPP RAN may be classified into four different categories:
Category 1, CAT-1:
No LBT,
Category 2, CAT-2:
LBT without random back-off (see FIG. 2),
Category 3, CAT-3:
LBT with random back-off with fixed size of contention window (see FIG. 2),
Category 4, CAT-4:
LBT with random back-off with variable size of contention window (see FIG. 2)

In FIG. 4, when performing a wideband operation within the supported or configured BWP 200 the channel occupancy time, COT, is initiated, e.g., by performing a CAT-4 LBT. Within a gNB-initiated COT (see FIG. 4 (a)) the UE may use a CAT-2 LBT procedure to transmit a PUCCH or PUSCH. Similarly, for a UE initiated COT using CAT-4 LBT (see FIG. 4 (b)), the gNB may use a CAT-2 LBT for transmitting within the UE-initiated COT a PDCCH or PDSCH. In either case, the gNB or the UE may indicate a maximum time the receiver may transmit within the $COT_{gNB}$ or $COT_{UE}$.

To save energy, the receiving device, like the UE, may listen only to subbands on which the transmitter, like the gNB, actually transmits and shares the COT with the receiver, like the UE. COT sharing (introduced for FeLAA=further enhanced licensed spectrum access, LAA) is a mechanism enabled, for example, by ETSI-BRAN (see reference [3]) wherein one device acquires a COT using, for example, CAT-4-LBT and another device shares this COT using a 25 μs LBT with a gap provided the amount of transmission does not exceed the maximum COT limit for the given priority class. This mechanism allows a concession for LAA in the uplink in which a gNB may send the grant to a UE before it may transmit on the uplink and the delay between the grant and the corresponding UL transmission is at least 4 ms. The pause of 4 ms is not accounted in the COT duration. This may also be used for autonomous uplink, AUL, so that, if the gNB acquires a COT and transmits on the DL without exhausting the full COT, it may indicate to all UEs via PDCCH that further transmitting time is left so that the UEs may transmit UL transmission with just a 25 μs LBT in the configured COT period. Likewise also UE to gNB COT sharing is possible and the UE may share its COT with the gNB which then may transmit with a 25 μs gap and a 25 μs LBT performed in the gap. The gNB transmission may be limited to two OFDM symbols and may contain feedback for a AUL transmission to the UE which acquired the COT and transmitted the AUL.

To save energy, the receiver, like the UE, may disable PDCCH monitoring for non-won subbands, i.e., occupied or busy subbands as determined by the gNB so that PDCCH blind decoding is performed only on those subbands which are actually used by the transmitter. For example, for a downlink in the unlicensed band operation, the receiver, like the UE, may perform one or more of the following operations so as to detect the presence/absence of an indication of a gNB or a transmitter COT on one or more of the subbands.

1. Dmrs Detection:
the UE may search for a specific DMRS sequence on each of the subbands, the specific DMRS sequence being indicative of a certain gNB-COT acquired by the gNB for the transmission to the UE.
2. Blind Decoding:
the UE may perform PDCCH blind decoding so as to detect an indication of a gNB-COT in the downlink control message, in case no PDCCH is detected in a subband, the UE assumes that for this subband no COT was acquired by the gNB.
3. Explicit Signaling:
the gNB signals, for example, in a group common, GC, PDCCH, the actual subbands used to the UE which then only monitors those active subbands, i.e., the signaled subbands, for PDCCH monitoring occasions.

The present invention provides improvements or enhancements in the wireless communication among entities of a wireless communication system using a wideband operation, for example, NR-U wideband enhancements and several aspects are provided for enhancing such wideband operation.

SUMMARY

An embodiment may have an apparatus for a wideband communication in a wireless communication system,
wherein, for a wideband communication with one or more transceivers in the wireless communication system using one or more subbands of a predefined wideband, the apparatus is configured to
perform an initial Listen-Before-Talk, LBT, for each subband of the predefined wideband so as to determine from the predefined wideband one or more non-occupied subbands on which the wideband communication is allowed during a certain transmission time, and
during the certain transmission time, transmit to and/or receive from the transceiver using the non-occupied subbands, and
wherein, during the certain transmission time and in case the initial LBT indicted that one or more of the subbands are occupied, the apparatus is configured to
perform a further LBT for the one or more occupied subbands so as to determine one or more of the initially occupied subbands being no longer occupied, and transmit to and/or receive from the transceiver using, in addition to the initially non-occupied subbands, the one or more no longer occupied subbands.

Another embodiment may have an apparatus for a wideband communication in a wireless communication system,
wherein, for a wideband communication with one or more transceivers in the wireless communication system using one or more subbands of a predefined wideband, the apparatus is configured to
perform Listen-Before-Talk, LBT, for each subband of the predefined wideband so as to determine from the predefined wideband non-occupied subbands, on which the wideband communication is allowed during a certain transmission time, and occupied subbands, on which the wideband communication is not allowed during the certain transmission time, and
during the certain transmission time, transmit to and/or receive from the transceiver using the non-occupied subbands, and
wherein the apparatus includes a plurality of predefined messages, each message associated with one or more certain LBT patterns, the LBT pattern indicating non-occupied and occupied subbands of the predefined wideband, and
wherein, responsive the LBT indicating a certain LBT pattern, the apparatus is configured to select from the plurality of predefined messages a message associated with the certain LBT pattern and to signal the selected message to the one or more transceivers.

Yet another embodiment may have an apparatus for a wideband communication in a wireless communication system,
wherein, for a wideband communication with one or more transceivers of the wireless communication system using one or more subbands of a predefined wideband, the apparatus includes a set of wideband configurations,
wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern obtained by the transceiver by performing LBT for each subband of the predefined wideband, and
wherein the apparatus is configured to
receive from the transceiver an indication of the wideband configuration to be used during the certain transmission time, and
transmit, during the certain transmission time, to the transceiver using the wideband configuration indicated by the transceiver.

Yet another embodiment may have an apparatus for a wideband communication in a wireless communication system,
wherein, for a wideband communication with one or more transceivers of the wireless communication system using one or more subbands of a predefined wideband, the apparatus is adapted to configure the transceiver with a set of wideband configurations,
wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern obtained by the apparatus by performing LBT for each subband of the predefined wideband, and
wherein the apparatus is configured to transmit to the transceiver an indication of the wideband configuration to be used during the certain transmission time.

Another embodiment may have an apparatus for a wideband communication in a wireless communication system,
wherein the apparatus includes a set of wideband configurations for a wideband communication with one or more transceivers of the wireless communication system using one or more subbands of a predefined wideband, each wideband configuration indicating a number of subbands from the predefined wideband to be used for the wideband communication,
wherein, after receiving from the transceiver an implicit or explicit indication of the wideband configuration to be used and a grant for a transmission to the transceiver, the apparatus is configured to prepare a plurality of transmissions, each transmission including a different number of subbands and/or different patterns of subbands (e.g., different subband patterns distinguishing, e.g., also the frequency) from the indicated wideband configuration, and
wherein the apparatus is configured to
perform Listen-Before-Talk, LBT, to obtain a LBT pattern, the LBT pattern indicating for the predefined wideband non-occupied subbands, on which the wideband communication is allowed during a certain transmission time, and occupied subbands, on which the wideband communication is not allowed during the certain transmission time, wherein the wideband configuration may be the full wideband or a configuration including a subset of subbands signaled by the transceiver,
select a prepared transmission which fulfils one or more certain criteria or fits the LBT pattern best, and
transmit, during the certain transmission time, the selected transmission to the transceiver.

Yet another embodiment may have an apparatus for a wideband communication in a wireless communication system,
wherein, for a wideband communication with one or more transceivers in the wireless communication system using one or more subbands of a predefined wideband, the apparatus is configured to
perform initial Listen-Before-Talk, LBT, for each subband of the predefined wideband so as to determine from the predefined wideband one or more non-occupied subbands on which the wideband communication is allowed during a certain transmission time, and
during the certain transmission time, transmit to and/or receive from the transceiver using the non-occupied subbands,
wherein, during the certain transmission time and in case the initial LBT indicated that one or more of the subbands are occupied, the apparatus is adapted to configure the transceiver to monitor the occupied subbands.

Yet another embodiment may have an apparatus for a wideband communication in a wireless communication system,
wherein, for a wideband communication with one or more transceivers in the wireless communication system using one or more subbands of a predefined wideband, the apparatus is configured to
receive from the transceiver an indication of non-occupied subbands of the predefined wideband, on which wideband communication is allowed during a certain transmission time, the non-occupied subbands, obtained by the transceiver by performing LBT for each subband of the predefined wideband, and
transmit, during the certain transmission time, to the transceiver using the non-occupied subbands of the predefined wideband,
wherein the apparatus is configured to
further receive from the transceiver an indication of occupied subbands of the predefined wideband, and monitor the occupied subbands.

Still another embodiment may have an apparatus for a wideband communication in a wireless communication system,
wherein, for a wideband communication with one or more transceivers in the wireless communication system using one or more subbands of a predefined wideband, the apparatus is configured to
perform an initial Listen-Before-Talk, LBT, for each subband of the predefined wideband so as to determine from the predefined wideband one or more non-occupied subbands on which the wideband communication is allowed during a certain transmission time and occupied subbands, on which the wideband communication is not allowed during the certain transmission time,
wherein the transmission includes one or more first parts associated with one or more non-occupied subbands and one or more second parts associated with one or more occupied subbands, and
wherein the apparatus is configured to
transmit the one or more first parts of the transmission using the one or more non-occupied subbands, and append the one or more second parts of the transmission to the one or more non-occupied subbands.

Still another embodiment may have an apparatus for a communication in a wireless communication system,
wherein, for a communication with one or more transceivers in the wireless communication system using one or more subbands, the apparatus is configured to
perform an initial Listen-Before-Talk, LBT, for each subband of the predefined wideband so as to determine from the predefined wideband one or more non-occupied subbands on which the wideband communication is allowed during a certain transmission time, and
wherein during the certain transmission time one or more of the subbands includes a first part and a second part, wherein the apparatus is configured to transmit to or receive from the transceiver in the first part with a certain subcarrier spacing, and to receive from or transmit to the transceiver in the second part with a further subcarrier spacing different from the certain subcarrier spacing.

According to an embodiment, a wireless communication system may have an inventive apparatus.

According to another embodiment, a method for a wideband communication in a wireless communication system may have the steps of:
for a wideband communication with one or more transceivers in the wireless communication system using one or more subbands of a predefined wideband,
performing an initial Listen-Before-Talk, LBT, for each subband of the predefined wideband so as to determine from the predefined wideband one or more non-occupied subbands on which the wideband communication is allowed during a certain transmission time, and
during the certain transmission time, transmitting to and/or receiving from the transceiver using the non-occupied subbands, and
during the certain transmission time and in case the initial LBT indicted that one or more of the subbands are occupied,
performing a further LBT for the one or more occupied subbands so as to determine one or more of the initially occupied subbands being no longer occupied, and
transmitting to and/or receiving from the transceiver using, in addition to the initially non-occupied subbands, the one or more no longer occupied subbands.

According to another embodiment, a method for a wideband communication in a wireless communication system may have the steps of:
for a wideband communication with one or more transceivers in the wireless communication system using one or more subbands of a predefined wideband,
performing Listen-Before-Talk, LBT, for each subband of the predefined wideband so as to determine from the predefined wideband non-occupied subbands, on which the wideband communication is allowed during a certain transmission time, and occupied subbands, on which the wideband communication is not allowed during the certain transmission time, and
during the certain transmission time, transmitting to and/or receiving from the transceiver using the non-occupied subbands, and
wherein a plurality of predefined messages is provided, each message associated with one or more certain LBT patterns, the LBT pattern indicating non-occupied and occupied subbands of the predefined wideband, and
responsive the LBT indicating a certain LBT pattern, selecting from the plurality of predefined messages a message associated with the certain LBT pattern and to signal the selected message to the one or more transceivers.

Another embodiment may have a method for a wideband communication in a wireless communication system,
wherein for a wideband communication with one or more transceivers of the wireless communication system using one or more subbands of a predefined wideband, a set of wideband configurations is provided,
wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern obtained by the transceiver by performing LBT for each subband of the predefined wideband, and
wherein the method may have the steps of:
receiving from the transceiver an indication of the wideband configuration to be used during the certain transmission time, and
transmitting, during the certain transmission time, to the transceiver using the wideband configuration indicated by the transceiver.

According to another embodiment, a method for a wideband communication in a wireless communication system may have the steps of:
- providing a set of wideband configurations for a wideband communication with one or more transceivers of the wireless communication system using one or more subbands of a predefined wideband, each wideband configuration indicating a number of subbands from the predefined wideband to be used for the wideband communication,
- after receiving from the transceiver an implicit or explicit indication of the wideband configuration to be used and a grant for a transmission to the transceiver, preparing a plurality of transmissions, each transmission including a different number of subbands and/or different patterns of subbands (e.g., different subband patterns distinguishing, e.g., also the frequency) from the indicated wideband configuration, and
- performing Listen-Before-Talk, LBT, to obtain a LBT pattern, the LBT pattern indicating for the predefined wideband non-occupied subbands, on which the wideband communication is allowed during a certain transmission time, and occupied subbands, on which the wideband communication is not allowed during the certain transmission time, wherein the wideband configuration may be the full wideband or a configuration including a subset of subbands signaled by the transceiver,
- selecting a prepared transmission which fulfils one or more certain criteria or fits the LBT pattern best, and
- transmitting, during the certain transmission time, the selected transmission to the transceiver.

According to another embodiment, a method for a wideband communication in a wireless communication system may have the steps of:
- for a wideband communication with one or more transceivers in the wireless communication system using one or more subbands of a predefined wideband,
  - performing initial Listen-Before-Talk, LBT, for each subband of the predefined wideband so as to determine from the predefined wideband one or more non-occupied subbands on which the wideband communication is allowed during a certain transmission time, and
  - during the certain transmission time, transmitting to and/or receiving from the transceiver using the non-occupied subbands,
- during the certain transmission time and in case the initial LBT indicated that one or more of the subbands are occupied, configuring the transceiver to monitor the occupied subbands.

According to another embodiment, a method for a wideband communication in a wireless communication system may have the steps of:
- for a wideband communication with one or more transceivers in the wireless communication system using one or more subbands of a predefined wideband,
  - receiving from the transceiver an indication of non-occupied subbands of the predefined wideband, on which wideband communication is allowed during a certain transmission time, the non-occupied subbands, obtained by the transceiver by performing LBT for each subband of the predefined wideband, and
  - transmitting, during the certain transmission time, to the transceiver using the non-occupied subbands of the predefined wideband,
  - further receiving from the transceiver an indication of occupied subbands of the predefined wideband, and
  - monitoring the occupied subbands.

According to yet another embodiment, a method for a wideband communication in a wireless communication system may have the steps of:
- for a wideband communication with one or more transceivers in the wireless communication system using one or more subbands of a predefined wideband,
  - performing an initial Listen-Before-Talk, LBT, for each subband of the predefined wideband so as to determine from the predefined wideband one or more non-occupied subbands on which the wideband communication is allowed during a certain transmission time and occupied subbands, on which the wideband communication is not allowed during the certain transmission time,
- wherein the transmission includes one or more first parts associated with one or more non-occupied subbands and one or more second parts associated with one or more occupied subbands, and
- transmitting the one or more first parts of the transmission using the one or more non-occupied subbands, and
- appending the one or more second parts of the transmission to the one or more non-occupied subbands.

According to yet another embodiment, a method for a wideband communication in a wireless communication system may have the steps of:
- for a communication with one or more transceivers in the wireless communication system using one or more subbands,
  - performing an initial Listen-Before-Talk, LBT, for each subband of the predefined wideband so as to determine from the predefined wideband one or more non-occupied subbands on which the wideband communication is allowed during a certain transmission time, and
- wherein during the certain transmission time one or more of the subbands includes a first part and a second part, wherein the method may have the steps of:
  - transmitting to or receiving from the transceiver in the first part with a certain subcarrier spacing, and
  - receiving from or transmitting to the transceiver in the second part with a further subcarrier spacing different from the certain subcarrier spacing.

According to yet another embodiment, a non-transitory digital storage medium having a computer program stored thereon to perform the inventive method(s), when said computer program is run by a computer.

Figure 1A:
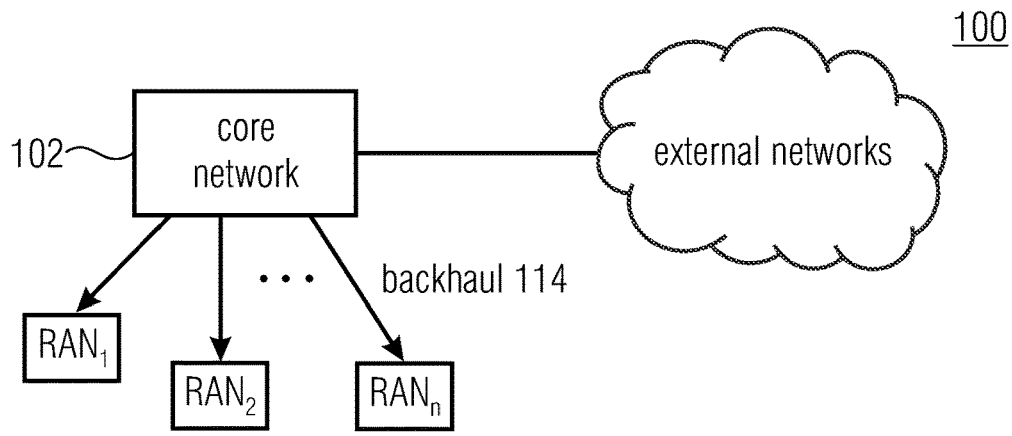
FIGS. 1a-b shows a schematic representation of an example of a wireless communication system.
Figure 1B:
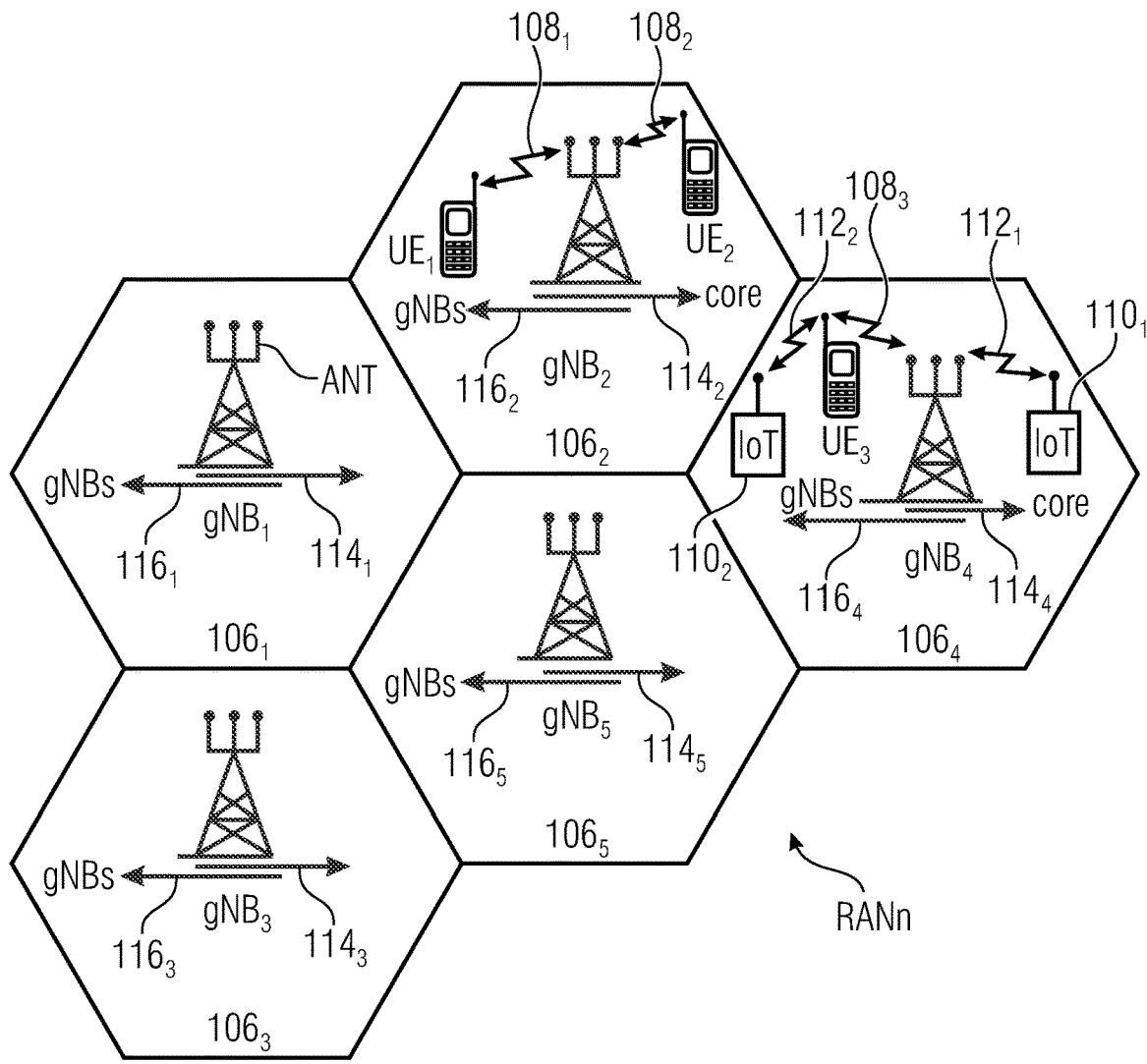
Figure 5:
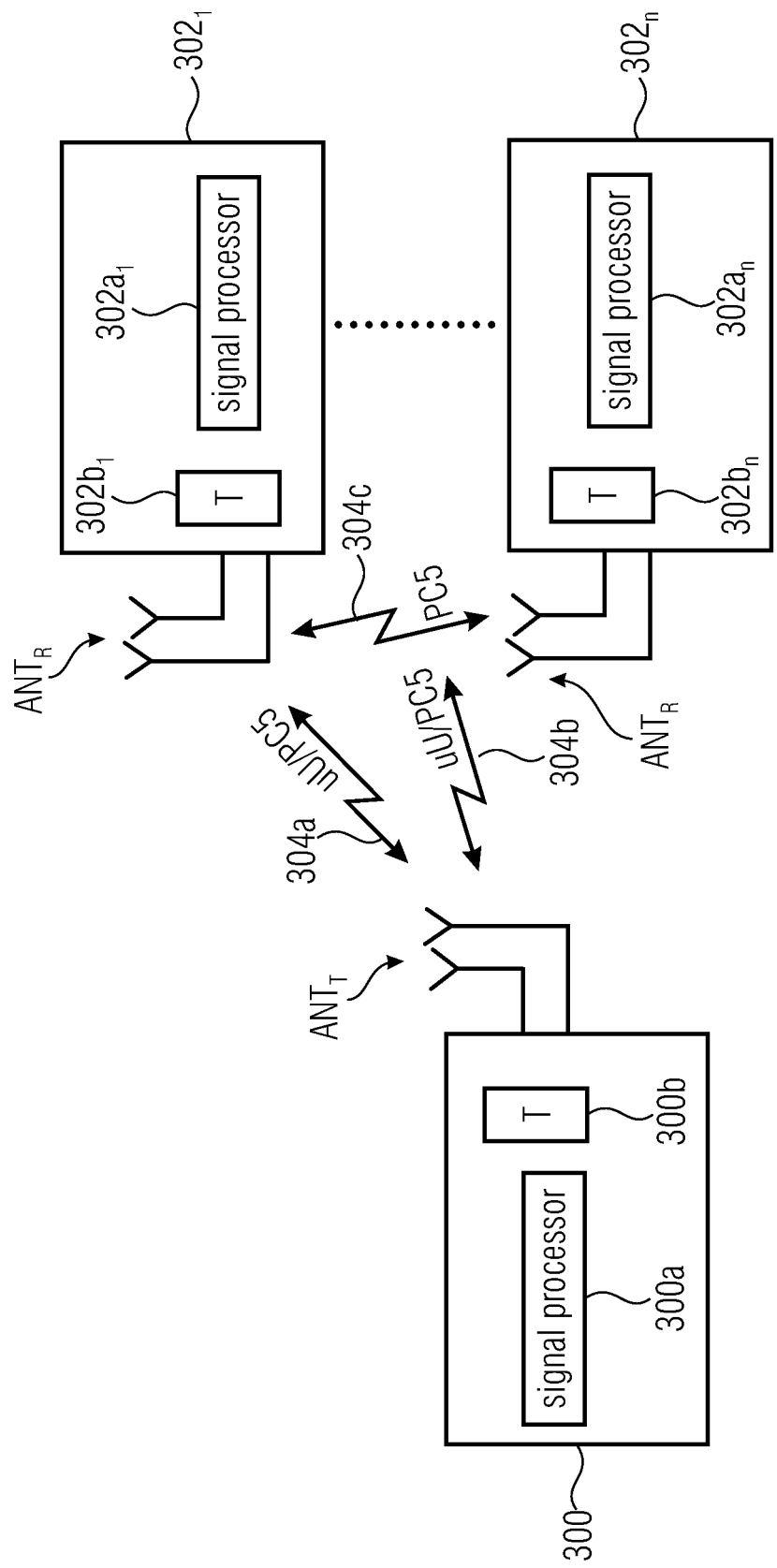
FIG. 5 is a schematic representation of a wireless communication system including a transmitter, like a base station, and one or more receivers, like user devices, UEs.

Embodiments of the present invention may be implemented in a wireless communication system as depicted in FIG. 1 including base stations and users, like mobile terminals or IoT devices. FIG. 5 is a schematic representation of a wireless communication system including a transmitter 300, like a base station, and one or more receivers $302_1$ to $302_n$, like user devices, UEs. The transmitter 300 and the receivers 302 may communicate via one or more wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 302 and the base stations 300 may operate in accordance with the inventive teachings described herein.

Network Devices, Like Base Station or User Device

1$^{st}$ ASPECT—Signaling of Re-Gained Subbands

The present invention provides an apparatus (UE, gNB) for a wideband communication in a wireless communication system, as is exemplified as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands.

wherein, for a wideband communication with one or more transceivers (UE, gNB) in the wireless communication system using one or more subbands of a predefined wideband, the apparatus is configured to perform an initial Listen-Before-Talk, LBT, for each subband of the predefined wideband so as to determine from the predefined wideband one or more non-occupied subbands on which the wideband communication is allowed during a certain transmission time (COT), and during the certain transmission time (COT), transmit to and/or receive from the transceiver using the non-occupied subbands, and wherein, during the certain transmission time (COT) and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially non-occupied subbands, the one or more no longer occupied subbands.

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, such that the apparatus is configured to transmit to and/or receive from the transceiver using the one or more no longer occupied subbands during a transmission time that is equal to the certain transmission time (COT), or longer than the certain transmission time (COT), or shorter than the certain transmission time (COT).

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, wherein the apparatus is configured to transmit to and/or receive from the transceiver using the one or more no longer occupied subbands during a transmission time that is equal to the certain transmission time, or longer than the certain transmission time, or shorter than the certain transmission time.

such that the transmission time of the one or more no longer occupied subbands is substantially aligned with the ending of the certain transmission time (COT); or is not-aligned with the ending of the certain transmission time (COT).

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, such that the apparatus is configured to signal to the one or more transceivers that the no longer occupied subbands are available.

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, wherein the apparatus is configured to signal to the one or more transceivers that the no longer occupied subbands are available such that the apparatus is configured to signal to the one or more transceivers the no longer occupied subbands using one or more of the initially non-occupied subbands and/or one or more of the no longer occupied subbands, the control message indicating the no longer occupied subbands.

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, wherein the apparatus is configured to signal to the one or more transceivers that the no longer occupied subbands are available such that a control message (DCI, UGI, RRC, OTT) is provided to the one or more transceivers, the control message indicating the no longer occupied subbands, wherein the control message may be provided by the apparatus using, e.g., RRC signaling or L1 signaling, or over the top, OTT, signaling, e.g., by the core network.

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, wherein the apparatus is configured to signal to the one or more transceivers that the no longer occupied subbands are available, wherein a control message is provided to the one or more transceivers, the control message indicating the no longer occupied subbands, wherein the control message may be provided by the apparatus using, e.g., RRC signaling or L1 signaling, or over the top, OTT, signaling, e.g., by the core network such that the control message includes wherein a control message is provided to the one or more transceivers, the control message indicating the no longer occupied subbands, wherein the control message may be provided by the apparatus using, e.g., RRC signaling or L1 signaling, or over the top, OTT, signaling, e.g., by the core network. a subband field indicating which of the subbands of the predefined wideband are available, e.g., by setting respective bits of the subband field associated with the subbands to a first value indicating a non-occupied state or to a second value indicating an occupied state.

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, wherein the apparatus is configured to signal to the one or more transceivers that the no longer occupied subbands are available such that the apparatus is a base station (gNB) of the wireless communication system and is configured to signal to one or more user devices (UE) of the wireless communication system the no longer occupied subbands in a PDCCH, the PDCCH including a DCI, or the apparatus is a user devices (UE) of the wireless communication system and is configured to signal to one or more base stations (gNB) of the wireless communication system the no longer occupied subbands in a PUCCH, the PUCCH including a UGI, or the apparatus is a user devices (UE) of the wireless communication system and is configured to signal to one or more user devices (UEs) of the wireless communication system the no longer occupied subbands in a PSCCH, the PSCCH 5 including a SCI.

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, wherein the apparatus is configured to signal to the one or more transceivers that the no longer occupied subbands are available such that the signaling indicates a frequency and/or bandwidth for a no longer occupied subband.

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, such that the apparatus is configured to wait for a certain time before transmitting using the no longer occupied subbands, e.g., for preparing a transmission on the no longer occupied subbands, like performing a rate matching procedure.

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, wherein the apparatus is configured to wait for a certain time before transmitting using the no longer occupied subbands, e.g., for preparing a transmission on the no longer occupied subbands, like performing a rate-matching procedure embodiments such that the apparatus comprises a timer (T), which may be a pre-configured timer or a configured timer, after which the apparatus transmits on the no longer occupied subbands, wherein the timer may start directly after an indication or a signaling indicating the existence of the no longer occupied subbands.

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, such that the apparatus is configured to transmit a reservation signaling at the beginning of a transmission time associated with the no longer occupied subband so as to reserve the subband.

2$^{nd}$ ASPECT—LBT-Outcome Reporting

The present invention provides an apparatus for a wideband communication in a wireless communication system, wherein, for a wideband communication with one or more transceivers in the wireless communication system using one or more subbands of a predefined wideband, the apparatus is configured to perform Listen-Before-Talk, LBT, for each subband of the predefined wideband so as to determine from the predefined wideband non-occupied subbands, on which the wideband communication is allowed during a certain transmission time, and occupied subbands, on which the wideband communication is not allowed during the certain transmission time, and during the certain transmission time, transmit to and/or receive from the transceiver using the non-occupied subbands, and wherein the apparatus comprises a plurality of predefined messages, each message associated with one or more certain LBT patterns, the LBT pattern indicating non-occupied and occupied subbands of the predefined wideband, and wherein, responsive the LBT indicating a certain LBT pattern, the apparatus is configured to select from the plurality of predefined messages a message associated with the certain LBT pattern and to signal the selected message to the one or more transceivers as an apparatus (UE, gNB) for a wideband communication in a wireless communication system, wherein, for a wideband communication with one or more transceivers (UE, gNB) in the wireless communication system using one or more subbands of a predefined wideband, the apparatus is configured to perform Listen-Before-Talk, LBT, for each subband of the predefined wideband so as to determine from the predefined wideband non-occupied subbands, on which the wideband communication is allowed during a certain transmission time (COT), and occupied subbands, on which the wideband communication is not allowed during the certain transmission time (COT), and during the certain transmission time (COT), transmit to and/or receive from the transceiver using the non-occupied subbands, and wherein the apparatus comprises a plurality of predefined messages, each message associated with one or more certain LBT patterns, the LBT pattern indicating non-occupied and occupied subbands of the predefined wideband, and wherein, responsive the LBT indicating a certain LBT pattern, the apparatus is configured to select from the plurality of predefined messages a message associated with the certain LBT pattern and to signal the selected message to the one or more transceivers.

In accordance with embodiments an apparatus for a wideband communication in a wireless communication system, wherein, for a wideband communication with one or more transceivers in the wireless communication system using one or more subbands of a predefined wideband, the apparatus is configured to perform Listen-Before-Talk, LBT, for each subband of the predefined wideband so as to determine from the predefined wideband non-occupied subbands, on which the wideband communication is allowed during a certain transmission time, and occupied subbands, on which the wideband communication is not allowed during the certain transmission time, and during the certain transmission time, transmit to and/or receive from the transceiver using the non-occupied subbands, and wherein the apparatus comprises a plurality of predefined messages, each message associated with one or more certain LBT patterns, the LBT pattern indicating non-occupied and occupied subbands of the predefined wideband, and wherein, responsive the LBT indicating a certain LBT pattern, the apparatus is configured to select from the plurality of predefined messages a message associated with the certain LBT pattern and to signal the selected message to the one or more transceivers such that the LBT pattern indicates only the non-occupied and the occupied subbands of the predefined wideband, or in addition to the non-occupied and occupied subbands of the predefined wideband also those non-occupied subbands used to transmit to and/or receive from the transceiver using the non-occupied subbands, e.g., to ensure the use of contiguous subbands in the UL, or solely he non-occupied actually used to transmit to and/or receive from the transceiver, e.g., to ensure the use of contiguous subbands in the UL.

In accordance with embodiments an apparatus for a wideband communication in a wireless communication system, wherein, for a wideband communication with one or more transceivers in the wireless communication system using one or more subbands of a predefined wideband, the apparatus is configured to perform Listen-Before-Talk, LBT, for each subband of the predefined wideband so as to determine from the predefined wideband non-occupied subbands, on which the wideband communication is allowed during a certain transmission time, and occupied subbands, on which the wideband communication is not allowed during the certain transmission time, and during the certain transmission time, transmit to and/or receive from the transceiver using the non-occupied subbands, and wherein the apparatus comprises a plurality of predefined messages, each message associated with one or more certain LBT patterns, the LBT pattern indicating non-occupied and occupied subbands of the predefined wideband, and wherein, responsive the LBT indicating a certain LBT pattern, the apparatus is configured to select from the plurality of predefined messages a message associated with the certain LBT pattern and to signal the selected message to the one or more transceivers such that the apparatus is configured to transmit the selected message at the beginning of the certain transmission time in one or more of the non-occupied subbands.

In accordance with embodiments an apparatus for a wideband communication in a wireless communication system, wherein, for a wideband communication with one or more transceivers in the wireless communication system using one or more subbands of a predefined wideband, the apparatus is configured to perform Listen-Before-Talk, LBT, for each subband of the predefined wideband so as to determine from the predefined wideband non-occupied subbands, on which the wideband communication is allowed during a certain transmission time, and occupied subbands, on which the wideband communication is not allowed during the certain transmission time, and during the certain transmission time, transmit to and/or receive from the transceiver using the non-occupied subbands, and wherein the apparatus comprises a plurality of predefined messages, each message associated with one or more certain LBT patterns, the LBT pattern indicating non-occupied and occupied subbands of the predefined wideband, and wherein, responsive the LBT indicating a certain LBT pattern, the apparatus is configured to select from the plurality of predefined messages a message associated with the certain LBT pattern and to signal the selected message to the one or more transceivers such that the predefined message comprises a short PDCCH or PUCCH or PSCCH format with a sequence-based encoding, e.g. PUCCH format 0.

In accordance with embodiments an apparatus for a wideband communication in a wireless communication system, wherein, for a wideband communication with one or more transceivers in the wireless communication system using one or more subbands of a predefined wideband, the apparatus is configured to perform Listen-Before-Talk, LBT, for each subband of the predefined wideband so as to determine from the predefined wideband non-occupied subbands, on which the wideband communication is allowed during a certain transmission time, and occupied subbands, on which the wideband communication is not allowed during the certain transmission time, and during the certain transmission time, transmit to and/or receive from the transceiver using the non-occupied subbands, and wherein the apparatus comprises a plurality of predefined messages, each message associated with one or more certain LBT patterns, the LBT pattern indicating non-occupied and occupied subbands of the predefined wideband, and wherein, responsive the LBT indicating a certain LBT pattern, the apparatus is configured to select from the plurality of predefined messages a message associated with the certain LBT pattern and to signal the selected message to the one or more transceivers a predefined message indicates multiple possible LBT patterns, wherein the LBT patterns put to the same state may be chosen so as to be easily distinguishable from each other, e.g. by utilizing power sensing, blind decoding or DMRS detection.

In accordance with embodiments an apparatus for a wideband communication in a wireless communication system, wherein, for a wideband communication with one or more transceivers in the wireless communication system using one or more subbands of a predefined wideband, the apparatus is configured to perform Listen-Before-Talk, LBT, for each subband of the predefined wideband so as to determine from the predefined wideband non-occupied subbands, on which the wideband communication is allowed during a certain transmission time, and occupied subbands, on which the wideband communication is not allowed during the certain transmission time, and during the certain transmission time, transmit to and/or receive from the transceiver using the non-occupied subbands, and wherein the apparatus comprises a plurality of predefined messages, each message associated with one or more certain LBT patterns, the LBT pattern indicating non-occupied and occupied subbands of the predefined wideband, and wherein, responsive the LBT indicating a certain LBT pattern, the apparatus is configured to select from the plurality of predefined messages a message associated with the certain LBT pattern and to signal the selected message to the one or more transceivers, wherein a predefined message indicates multiple possible LBT patterns, wherein the LBT patterns put to the same state may be chosen so as to be easily distinguishable from each other, e.g. by utilizing power sensing, blind decoding or DMRS detection, wherein a predefined message indicates multiple possible LBT patterns, wherein the LBT patterns put to the same state may be chosen so as to be easily distinguishable from each other, e.g. by utilizing power sensing, blind decoding or DMRS detection such that the predefined wideband comprises four subbands, wherein an LBT pattern is signaled using a plurality of bits, e.g., bits of a subband field of a control message, and wherein bits having a first value indicate a non-occupied state and bits having a second value indicate an occupied state, and wherein, when using two bits, the LBT pattern may be signaled as follows:

| | LBT-subbands used for TX (W—non-occupied or won or used/transmitting, L—occupied or lost or not used/not transmitting) |
|---|---|
| 00 | WWWW |
| 01 | WWWL/LWWW |
| 10 | LLWW/WWLL |
| 11 | LWWL | or

| | LBT-subbands used for TX (W—non-occupied or won or used/transmitting, L—occupied or lost or not used/not transmitting) |
|---|---|
| 00 | WWWW |
| 01 | WWWL/LWWW |
| 10 | LLWW/WWLL/LWWL |
| 11 | WLLL/LWLL/LLWL/LLLW | or

| | LBT-subbands used for TX (W—non-occupied or won or used/transmitting, L—occupied or lost or not used/not transmitting) |
|---|---|
| 00 | WWWW/WLLL/LLLW |
| 01 | WWWL/LWWW |
| 10 | LLWW/WWLL/LWWL |
| 11 | LWLL/LLWL | or wherein, when using three bits, the LBT pattern may be signaled as follows:

| | LBT-subbands used for TX (W—non-occupied or won or used/transmitting, L—occupied or lost or not used/not transmitting) |
|---|---|
| 000 | WWWW |
| 001 | LWWW |
| 010 | WWWL |

-continued

| | LBT-subbands used for TX<br>(W—non-occupied or won or used/transmitting,<br>L—occupied or lost or not used/not transmitting) |
|---|---|
| 011 | LLWW |
| 100 | WWLL |
| 101 | LWWL |
| 110 | LLWL |
| 110 | LWLL |
| 111 | WLLL/LLLW |

3$^{rd}$ ASPECT—Pre-Configured Grant/Assignment for Wideband Operation

The present invention provides an apparatus for a wideband communication in a wireless communication system, wherein, for a wideband communication with one or more transceivers of the wireless communication system using one or more subbands of a predefined wideband, the apparatus comprises a set of wideband configurations, wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern acquired by the transceiver by performing LBT for each subband of the predefined wideband, and wherein the apparatus is configured to
  receive from the transceiver an indication of the wideband configuration to be used during the certain transmission time, and
  transmit, during the certain transmission time, to the transceiver using the wideband configuration indicated by the transceiver as an apparatus (UE, gNB) for a wideband communication in a wireless communication system,
  wherein, for a wideband communication with one or more transceivers (gNB, UE) of the wireless communication system using one or more subbands of a predefined wideband, the apparatus comprises a set of wideband configurations,
  wherein each wideband configuration is associated with a certain Listen-Before-Talk, LBT, pattern, the LBT pattern indicating for the predefined wideband non-occupied subbands, on which the wideband communication is allowed during a certain transmission time (COT), and occupied subbands, on which the wideband communication is not allowed during the certain transmission time (COT), the LBT pattern obtained by the transceiver (gNB, UE) by performing LBT for each subband of the predefined wideband, and
  wherein the apparatus is configured to
    receive from the transceiver (gNB, UE) an indication of the wideband configuration to be used during the certain transmission time (COT), and
    transmit, during the certain transmission time (COT), to the transceiver (gNB, UE) using the wideband configuration indicated by the transceiver.

In accordance with an apparatus for a wideband communication in a wireless communication system, wherein, for a wideband communication with one or more transceivers of the wireless communication system using one or more subbands of a predefined wideband, the apparatus comprises a set of wideband configurations, wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern acquired by the transceiver by performing LBT for each subband of the predefined wideband, and wherein the apparatus is configured to
  receive from the transceiver an indication of the wideband configuration to be used during the certain transmission time, and
  transmit, during the certain transmission time, to the transceiver using the wideband configuration indicated by the transceiver embodiments such that the indication of the wideband configuration is received from the transceiver together with a DL assignment or an UL grant or a sidelink, SL, grant.

In accordance with an apparatus for a wideband communication in a wireless communication system, wherein, for a wideband communication with one or more transceivers of the wireless communication system using one or more subbands of a predefined wideband, the apparatus comprises a set of wideband configurations, wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern acquired by the transceiver by performing LBT for each subband of the predefined wideband, and wherein the apparatus is configured to
  receive from the transceiver an indication of the wideband configuration to be used during the certain transmission time, and
  transmit, during the certain transmission time, to the transceiver using the wideband configuration indicated by the transceiver such that the apparatus is configured to receive from the transceiver (gNB, UE) the set of wideband configurations using, e.g., RRC or L1 signaling.

In accordance with an apparatus for a wideband communication in a wireless communication system, wherein, for a wideband communication with one or more transceivers of the wireless communication system using one or more subbands of a predefined wideband, the apparatus comprises a set of wideband configurations, wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern acquired by the transceiver by performing LBT for each subband of the predefined wideband, and wherein the apparatus is configured to
  receive from the transceiver an indication of the wideband configuration to be used during the certain transmission time, and
  transmit, during the certain transmission time, to the transceiver using the wideband configuration indicated by the transceiver such that the apparatus is configured to receive from the transceiver (gNB, UE) a control message, like DCI or UGI, the control message including the wideband configuration to be used.

The present invention provides an apparatus for a wideband communication in a wireless communication system, wherein, for a wideband communication with one or more transceivers of the wireless communication system using one or more subbands of a predefined wideband, the apparatus is adapted to configure the transceiver with a set of wideband configurations, wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern acquired by the apparatus by performing LBT for each subband of the predefined wideband, and wherein the apparatus is configured to transmit to the transceiver an indication of the wideband configuration to be used during the certain transmission time as apparatus (gNB, UE) for a wideband communication in a wireless communication system,
- wherein, for a wideband communication with one or more transceivers (UE, gNB) of the wireless communication system using one or more subbands of a predefined wideband, the apparatus is adapted to configure the transceiver with a set of wideband configurations,
- wherein each wideband configuration is associated with a certain Listen-Before-Talk, LBT, pattern, the LBT pattern indicating for the predefined wideband non-occupied subbands, on which the wideband communication is allowed during a certain transmission time (COT), and occupied subbands, on which the wideband communication is not allowed during the certain transmission time (COT), the LBT pattern obtained by the apparatus (gNB, UE) by performing LBT for each subband of the predefined wideband, and
- wherein the apparatus is configured to transmit to the transceiver (gNB, UE) an indication of the wideband configuration to be used during the certain transmission time (COT).

In accordance with an apparatus for a wideband communication in a wireless communication system, wherein, for a wideband communication with one or more transceivers of the wireless communication system using one or more subbands of a predefined wideband, the apparatus is adapted to configure the transceiver with a set of wideband configurations, wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern acquired by the apparatus by performing LBT for each subband of the predefined wideband, and wherein the apparatus is configured to transmit to the transceiver an indication of the wideband configuration to be used during the certain transmission time such that the indication of the wideband configuration is transmitted together with a DL assignment or an UL grant or a sidelink, SL, grant.

In accordance with an apparatus for a wideband communication in a wireless communication system, wherein, for a wideband communication with one or more transceivers of the wireless communication system using one or more subbands of a predefined wideband, the apparatus is adapted to configure the transceiver with a set of wideband configurations, wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern acquired by the apparatus by performing LBT for each subband of the predefined wideband, and wherein the apparatus is configured to transmit to the transceiver an indication of the wideband configuration to be used during the certain transmission time such that the apparatus is configured to provide the set of wideband configurations to the transceiver (UE, gNB) using, e.g., RRC or L1 signaling.

In accordance with an apparatus for a wideband communication in a wireless communication system, wherein, for a wideband communication with one or more transceivers of the wireless communication system using one or more subbands of a predefined wideband, the apparatus is adapted to configure the transceiver with a set of wideband configurations, wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern acquired by the apparatus by performing LBT for each subband of the predefined wideband, and wherein the apparatus is configured to transmit to the transceiver an indication of the wideband configuration to be used during the certain transmission time such that the apparatus is configured to transmit to the transceiver (UE, gNB) a control message, like DCI or UGI, the control message including the wideband configuration to be used.

$4^{th}$ ASPECT—Transmission Preparation, Like PUSCH or PDSCH

The present invention provides an apparatus for a wideband communication in a wireless communication system, wherein the apparatus comprises a set of wideband configurations for a wideband communication with one or more transceivers of the wireless communication system using one or more subbands of a predefined wideband, each wideband configuration indicating a number of subbands from the predefined wideband to be used for the wideband communication, wherein, after receiving from the transceiver an implicit or explicit indication of the wideband configuration to be used and a grant for a transmission to the transceiver, the apparatus is configured to prepare a plurality of transmissions, each transmission comprising a different number of subbands and/or different patterns of subbands (e.g., different subband patterns distinguishing, e.g., also the frequency) from the indicated wideband configuration, and wherein the apparatus is configured to
- perform Listen-Before-Talk, LBT, to acquire a LBT pattern, the LBT pattern indicating for the predefined wideband non-occupied subbands, on which the wideband communication is allowed during a certain transmission time, and occupied subbands, on which the wideband communication is not allowed during the certain transmission time, wherein the wideband configuration may be the full wideband or a configuration comprising a subset of subbands signaled by the transceiver,
- select a prepared transmission which fulfils one or more certain criteria or fits the LBT pattern best, and transmit, during the certain transmission time, the selected transmission to the transceiver as an apparatus (UE, gNB) for a wideband communication in a wireless communication system, wherein the apparatus comprises a set of wideband configurations for a wideband communication with one or more transceivers (gNB, UE) of the wireless communication system using one or more subbands of a predefined wideband, each wideband configuration indicating a number of subbands from the predefined wideband to be used for the wideband communication, wherein, after receiving from the transceiver (gNB, UE) an implicit or explicit indication of the wideband configuration to be used and a grant for a transmission to the transceiver, the apparatus is configured to prepare a plurality of transmissions, each transmission including a different number of subbands and/or different patterns of subbands (e.g., different subband patterns distinguishing, e.g., also the frequency) from the indicated wideband configuration, and wherein the apparatus is configured to
perform Listen-Before-Talk, LBT, to obtain a LBT pattern, the LBT pattern indicating for the predefined wideband non-occupied subbands, on which the wideband communication is allowed during a certain transmission time (COT), and occupied subbands, on which the wideband communication is not allowed during the certain transmission time (COT), wherein the wideband configuration may be the full wideband or a configuration comprising a subset of subbands signaled by the transceiver, select a prepared transmission which fulfils one or more certain criteria or fits the LBT pattern best, and
transmit, during the certain transmission time (COT), the selected transmission to the transceiver (gNB, UE).

In accordance with an apparatus for a wideband communication in a wireless communication system, wherein the apparatus comprises a set of wideband configurations for a wideband communication with one or more transceivers of the wireless communication system using one or more subbands of a predefined wideband, each wideband configuration indicating a number of subbands from the predefined wideband to be used for the wideband communication, wherein, after receiving from the transceiver an implicit or explicit indication of the wideband configuration to be used and a grant for a transmission to the transceiver, the apparatus is configured to prepare a plurality of transmissions, each transmission comprising a different number of subbands and/or different patterns of subbands (e.g., different subband patterns distinguishing, e.g., also the frequency) from the indicated wideband configuration, and wherein the apparatus is configured to perform Listen-Before-Talk, LBT, to acquire a LBT pattern, the LBT pattern indicating for the predefined wideband non-occupied subbands, on which the wideband communication is allowed during a certain transmission time, and occupied subbands, on which the wideband communication is not allowed during the certain transmission time, wherein the wideband configuration may be the full wideband or a configuration comprising a subset of subbands signaled by the transceiver, select a prepared transmission which fulfils one or more certain criteria or fits the LBT pattern best, and
transmit, during the certain transmission time, the selected transmission to the transceiver such that the apparatus is configured to receive from the transceiver (gNB, UE) the set of transmissions to prepare using, e.g., RRC or L1 signaling.

In accordance with an apparatus for a wideband communication in a wireless communication system, wherein the apparatus comprises a set of wideband configurations for a wideband communication with one or more transceivers of the wireless communication system using one or more subbands of a predefined wideband, each wideband configuration indicating a number of subbands from the predefined wideband to be used for the wideband communication, wherein, after receiving from the transceiver an implicit or explicit indication of the wideband configuration to be used and a grant for a transmission to the transceiver, the apparatus is configured to prepare a plurality of transmissions, each transmission comprising a different number of subbands and/or different patterns of subbands (e.g., different subband patterns distinguishing, e.g., also the frequency) from the indicated wideband configuration, and wherein the apparatus is configured to perform Listen-Before-Talk, LBT, to acquire a LBT pattern, the LBT pattern indicating for the predefined wideband non-occupied subbands, on which the wideband communication is allowed during a certain transmission time, and occupied subbands, on which the wideband communication is not allowed during the certain transmission time, wherein the wideband configuration may be the full wideband or a configuration comprising a subset of subbands signaled by the transceiver, select a prepared transmission which fulfils one or more certain criteria or fits the LBT pattern best, and
transmit, during the certain transmission time, the selected transmission to the transceiver such that the one or more certain criteria comprises one or more of:
a data rate exceeding a predefined threshold,
the largest transport block size (TBS) fitting the LBT pattern,
the highest number of subbands fitting the LBT pattern,
a channel quality exceeding a predefined threshold,
a priority of the associated subband configuration.

In accordance with an apparatus for a wideband communication in a wireless communication system, wherein the apparatus comprises a set of wideband configurations for a wideband communication with one or more transceivers of the wireless communication system using one or more subbands of a predefined wideband, each wideband configuration indicating a number of subbands from the predefined wideband to be used for the wideband communication, wherein, after receiving from the transceiver an implicit or explicit indication of the wideband configuration to be used and a grant for a transmission to the transceiver, the apparatus is configured to prepare a plurality of transmissions, each transmission comprising a different number of subbands and/or different patterns of subbands (e.g., different subband patterns distinguishing, e.g., also the frequency) from the indicated wideband configuration, and wherein the apparatus is configured to perform Listen-Before-Talk, LBT, to acquire a LBT pattern, the LBT pattern indicating for the predefined wideband non-occupied subbands, on which the wideband communication is allowed during a certain transmission time, and occupied subbands, on which the wideband communication is not allowed during the certain transmission time, wherein the wideband configuration may be the full wideband or a configuration comprising a subset of subbands signaled by the transceiver, select a prepared transmission which fulfils one or more certain criteria or fits the LBT pattern best, and transmit, during the certain transmission time, the selected transmission to the transceiver embodiments such that the apparatus is configured to prepare a transmission having a short transmission length, e.g., one subband, and send the transmission on other subbands, if available, so as to keep the other subbands busy, wherein the apparatus may indicate the number of used subbands, or generate multiple transmissions having different transmission lengths, e.g., different numbers of subbands, and puncture the transmission so as to have a size, number of subbands, nearest to the number of non-occupied subbands, wherein the apparatus may indicate the number of used subbands, or generate multiple transmissions having different transmission lengths, e.g., different numbers of subbands, and choose the transmission with the highest length smaller or equal to the number of non-occupied subbands, wherein the apparatus may indicate the number of used subbands.

5$^{th}$ ASPECT—Control Channel Monitoring Enabling for not-Won Subbands

The present invention provides an apparatus for a wideband communication in a wireless communication system, wherein, for a wideband communication with one or more transceivers in the wireless communication system using one or more subbands of a predefined wideband, the apparatus is configured to perform initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, wherein, during the certain transmission time and in case the initial LBT indicated that one or more of the subbands are occupied, the apparatus is adapted to configure the transceiver to monitor the occupied subbands as an apparatus (UE, gNB) for a wideband communication in a wireless communication system, wherein, for a wideband communication with one or more transceivers (UE, gNB) in the wireless communication system using one or more subbands of a predefined wideband, the apparatus is configured to perform initial Listen-Before-Talk, LBT, for each subband of the predefined wideband so as to determine from the predefined wideband one or more non-occupied subbands on which the wideband communication is allowed during a certain transmission time (COT), and during the certain transmission time (COT), transmit to and/or receive from the transceiver using the non-occupied subbands, wherein, during the certain transmission time (COT) and in case the initial LBT indicated that one or more of the subbands are occupied, the apparatus is adapted to configure the transceiver to monitor the occupied subbands.

In accordance with an apparatus for a wideband communication in a wireless communication system, wherein, for a wideband communication with one or more transceivers in the wireless communication system using one or more subbands of a predefined wideband, the apparatus is configured to perform initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, wherein, during the certain transmission time and in case the initial LBT indicated that one or more of the subbands are occupied, the apparatus is adapted to configure the transceiver to monitor the occupied subbands such that the configuration uses, e.g., RRC signaling or L1 signaling, or over the top, OTT, signaling, e.g., by the core network.

The present invention provides an apparatus for a wideband communication in a wireless communication system, wherein, for a wideband communication with one or more transceivers in the wireless communication system using one or more subbands of a predefined wideband, the apparatus is configured to receive from the transceiver an indication of non-occupied subbands of the predefined wideband, on which wideband communication is allowed during a certain transmission time, the non-occupied subbands, acquired by the transceiver by performing LBT for each subband of the predefined wideband, and transmit, during the certain transmission time, to the transceiver using the nonoccupied subbands of the predefined wideband, wherein the apparatus is configured to further receive from the transceiver an indication of occupied subbands of the predefined wideband, and monitor the occupied subbands as an apparatus (UE, gNB) for a wideband communication in a wireless communication system, wherein, for a wideband communication with one or more transceivers (UE, gNB) in the wireless communication system using one or more subbands of a predefined wideband, the apparatus is configured to receive from the transceiver an indication of non-occupied subbands of the predefined wideband, on which wideband communication is allowed during a certain transmission time (COT), the non-occupied subbands, obtained by the transceiver (gNB, UE) by performing LBT for each subband of the predefined wideband, and transmit, during the certain transmission time (COT), to the transceiver using the non-occupied subbands of the predefined wideband, wherein the apparatus is configured to further receive from the transceiver an indication of occupied subbands of the predefined wideband, and monitor the occupied subbands.

In accordance with an apparatus for a wideband communication in a wireless communication system, wherein, for a wideband communication with one or more transceivers in the wireless communication system using one or more subbands of a predefined wideband, the apparatus is configured to receive from the transceiver an indication of non-occupied subbands of the predefined wideband, on which wideband communication is allowed during a certain transmission time, the non-occupied subbands, acquired by the transceiver by performing LBT for each subband of the predefined wideband, and transmit, during the certain transmission time, to the transceiver using the nonoccupied subbands of the predefined wideband, wherein the apparatus is configured to further receive from the transceiver an indication of occupied subbands of the predefined wideband, and monitor the occupied subbands such that the apparatus is configured to monitor the subbands using, e.g., RRC signaling or L1 signaling, or over the top, OTT, signaling, e.g., by the core network.

6th ASPECT—Appending of Punctured Parts

The present invention provides an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time and occupied subbands, on which the wideband communication is not allowed during the certain transmission time, wherein the transmission comprises one or more first parts associated with one or more non-occupied subbands and one or more second parts associated with one or more occupied subbands, and wherein the apparatus is configured to transmit the one or more first parts of the transmission using the one or more nonoccupied subbands, and append the one or more second parts of the transmission to the one or more nonoccupied subbands as an apparatus (UE, gNB) for a wideband communication in a wireless communication system, wherein, for a wideband communication with one or more transceivers (UE, gNB) in the wireless communication system using one or more subbands of a predefined wideband, the apparatus is configured to perform an initial Listen-Before-Talk, LBT, for each subband of the predefined wideband so as to determine from the predefined wideband one or more non-occupied subbands on which the wideband communication is allowed during a certain transmission time (COT) and occupied subbands, on which the wideband communication is not allowed during the certain transmission time (COT), wherein the transmission includes one or more first parts associated with one or more non-occupied subbands and one or more second parts associated with one or more occupied subbands, and wherein the apparatus is configured to transmit the one or more first parts of the transmission using the one or more non-occupied subbands, and append the one or more second parts of the transmission to the one or more non-occupied subbands.

In accordance with an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time and occupied subbands, on which the wideband communication is not allowed during the certain transmission time, wherein the transmission comprises one or more first parts associated with one or more non-occupied subbands and one or more second parts associated with one or more occupied subbands, and wherein the apparatus is configured to transmit the one or more first parts of the transmission using the one or more nonoccupied subbands, and append the one or more second parts of the transmission to the one or more nonoccupied subbands such that the apparatus is configured to inform the transceiver during the certain transmission time (COT)

that the one or more second parts are transmitted, and about the one or more non-occupied subbands used for transmitting the one or more second parts.

In accordance with an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time and occupied subbands, on which the wideband communication is not allowed during the certain transmission time, wherein the transmission comprises one or more first parts associated with one or more non-occupied subbands and one or more second parts associated with one or more occupied subbands, and wherein the apparatus is configured to transmit the one or more first parts of the transmission using the one or more nonoccupied subbands, and append the one or more second parts of the transmission to the one or more nonoccupied subbands such that the apparatus is configured to indicate that a puncturing occurred and that a retransmission of one or more punctured parts is performed, or indicate that a retransmission of one or more punctured parts is performed, thereby informing the transceiver that a puncturing occurred.

In accordance with an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time and occupied subbands, on which the wideband communication is not allowed during the certain transmission time, wherein the transmission comprises one or more first parts associated with one or more non-occupied subbands and one or more second parts associated with one or more occupied subbands, and wherein the apparatus is configured to transmit the one or more first parts of the transmission using the one or more nonoccupied subbands, and append the one or more second parts of the transmission
to the one or more nonoccupied subbands,
wherein the apparatus is configured to inform the transceiver
during the certain transmission time
   that the one or more second parts are transmitted, and
   about the one or more non-occupied subbands used for
      transmitting the one or more second parts such that the
      apparatus is configured to signal the puncturing/re-
      transmission at the beginning or at the end of the
      original transmission.

In accordance with an apparatus for a wideband communication in a wireless communication system, wherein, for a wideband communication with one or more transceivers in the wireless communication system using one or more subbands of a predefined wideband, the apparatus is configured to
   perform an initial Listen-Before-Talk, LBT, for each
      subband of the predefined wideband so as to determine
      from the predefined wideband one or more nonoccu-
      pied subbands on which the wideband communication
      is allowed during a certain transmission time and
      occupied subbands, on which the wideband communi-
      cation is not allowed during the certain transmission
      time, wherein the transmission comprises one or more
      first parts associated with one or more non-occupied
      subbands and one or more second parts associated with
      one or more occupied subbands, and wherein the appa-
      ratus is configured to
   transmit the one or more first parts of the transmission
      using the one or more nonoccupied subbands, and
   append the one or more second parts of the transmission
      to the one or more nonoccupied subbands such that
      appending the one or more second parts of the trans-
      mission to the one or more non-occupied subbands
      comprises:
   initiating a new transmission time (COT), or
   prolonging the current transmission time (COT).

In accordance with an apparatus for a wideband communication in a wireless communication system, wherein, for a wideband communication with one or more transceivers in the wireless communication system using one or more subbands of a predefined wideband, the apparatus is configured to
   perform an initial Listen-Before-Talk, LBT, for each
      subband of the predefined wideband so as to determine
      from the predefined wideband one or more nonoccu-
      pied subbands on which the wideband communication
      is allowed during a certain transmission time and
      occupied subbands, on which the wideband communi-
      cation is not allowed during the certain transmission
      time, wherein the transmission comprises one or more
      first parts associated with one or more non-occupied
      subbands and one or more second parts associated with
      one or more occupied subbands, and wherein the appa-
      ratus is configured to
   transmit the one or more first parts of the transmission
      using the one or more nonoccupied subbands, and
   append the one or more second parts of the transmission
      to the one or more nonoccupied subbands,
wherein appending the one or more second parts of the transmission to the one or more non-occupied subbands comprises:
   initiating a new transmission time, or
   prolonging the current transmission time. such that initi-
      ating a new transmission time (COT), the apparatus is
      configured to
   perform a further LBT at the end of the current transmis-
      sion time (COT) on one or more of the initially non-
      occupied subbands, e.g., by performing a CAT-4 or
      CAT-2 LBT, and
   responsive to the further LBT indicating that the initially
      non-occupied subband is not occupied, append the one
      or more second parts.

In accordance with an apparatus for a wideband communication in a wireless communication system, wherein, for a wideband communication with one or more transceivers in the wireless communication system using one or more subbands of a predefined wideband, the apparatus is configured to
   perform an initial Listen-Before-Talk, LBT, for each
      subband of the predefined wideband so as to determine
      from the predefined wideband one or more nonoccu-
      pied subbands on which the wideband communication
      is allowed during a certain transmission time and
      occupied subbands, on which the wideband communi-
      cation is not allowed during the certain transmission
      time, wherein the transmission comprises one or more
      first parts associated with one or more non-occupied
      subbands and one or more second parts associated with
      one or more occupied subbands, and wherein the appa-
      ratus is configured to
   transmit the one or more first parts of the transmission
      using the one or more nonoccupied subbands, and
   append the one or more second parts of the transmission
      to the one or more nonoccupied subbands,
wherein appending the one or more second parts of the transmission to the one or more non-occupied subbands comprises:
   initiating a new transmission time, or
   prolonging the current transmission time,
such that the current transmission time (COT), the apparatus is configured to
   perform the initial LBT such that a transmission time
      (COT) is obtained which is sufficient to append at least
      some of the one or more second parts, e.g., by choosing
      a contention window size, CWS, for the LBT to obtain
      a maximum allowed COT duration.

In accordance with an apparatus for a wideband communication in a wireless communication system, wherein, for a wideband communication with one or more transceivers in the wireless communication system using one or more subbands of a predefined wideband, the apparatus is configured to
   perform an initial Listen-Before-Talk, LBT, for each
      subband of the predefined wideband so as to determine
      from the predefined wideband one or more nonoccu-
      pied subbands on which the wideband communication
      is allowed during a certain transmission time and
      occupied subbands, on which the wideband communi-
      cation is not allowed during the certain transmission
      time, wherein the transmission comprises one or more
      first parts associated with one or more non-occupied
      subbands and one or more second parts associated with
      one or more occupied subbands, and wherein the appa-
      ratus is configured to
   transmit the one or more first parts of the transmission
      using the one or more nonoccupied subbands, and.
   append the one or more second parts of the transmission
      to the one or more nonoccupied subbands, wherein appending the one or more second parts of the transmission to the one or more non-occupied subbands comprises:
    initiating a new transmission time, or
    prolonging the current transmission time,
wherein, for prolonging the current transmission time, the apparatus is configured to
    perform the initial LBT such that a transmission time is acquired which is sufficient to append at least some of the one or more second parts, e.g., by choosing a contention window size, CWS, for the LBT to acquire a maximum allowed certain transmission-time duration such that the possible transmission time 15 (COT) is signaled within the original transmission using, e.g., DCI or UGI.

7$^{th}$ ASPECT—Separate Subcarrier Spacing (SCS) Fast Control without LBT

The present invention provides an apparatus for a communication in a wireless communication system, wherein, for a communication with one or more transceivers in the wireless communication system using one or more subbands, the apparatus is configured to
    perform an initial Listen-Before-Talk, LBT, for each subband of the predefined wideband so as to determine from the predefined wideband one or more nonoccupied subbands on which the wideband communication is allowed during a certain transmission time, and wherein during the certain transmission time one or more of the subbands comprises a first part and a second part, wherein the apparatus is configured to transmit to or receive from the transceiver in the first part with a certain subcarrier spacing, and to receive from or transmit to the transceiver in the second part with a further subcarrier spacing different from the certain subcarrier spacing as an apparatus (UE, gNB) for a communication in a wireless communication system,
    wherein, for a communication with one or more transceivers (UE, gNB) in the wireless communication system using one or more subbands, the apparatus is configured to
        perform an initial Listen-Before-Talk, LBT, for each subband of the predefined wideband so as to determine from the predefined wideband one or more non-occupied subbands on which the wideband communication is allowed during a certain transmission time (COT), and
    wherein during the certain transmission time (COT) one or more of the subbands includes a first part and a second part, wherein the apparatus is configured to transmit to or receive from the transceiver in the first part with a certain subcarrier spacing, and to receive from or transmit to the transceiver in the second part with a further subcarrier spacing different from the certain subcarrier spacing.

In accordance with an apparatus for a communication in a wireless communication system, wherein, for a communication with one or more transceivers in the wireless communication system using one or more subbands, the apparatus is configured to
    perform an initial Listen-Before-Talk, LBT, for each subband of the predefined wideband so as to determine from the predefined wideband one or more nonoccupied subbands on which the wideband communication is allowed during a certain transmission time, and wherein during the certain transmission time one or more of the subbands comprises a first part and a second part, wherein the apparatus is configured to transmit to or receive from the transceiver in the first part with a certain subcarrier spacing, and to receive from or transmit to the transceiver in the second part with a further subcarrier spacing different from the certain subcarrier spacing such that the certain subcarrier spacing in the first part comprises a first subcarrier spacing for transmitting and a second subcarrier spacing
    for receiving, the first subcarrier spacing and the second subcarrier spacing being different.

In accordance with an apparatus for a communication in a wireless communication system, wherein, for a communication with one or more transceivers in the wireless communication system using one or more subbands, the apparatus is configured to
    perform an initial Listen-Before-Talk, LBT, for each subband of the predefined wideband so as to determine from the predefined wideband one or more nonoccupied subbands on which the wideband communication is allowed during a certain transmission time, and wherein during the certain transmission time one or more of the subbands comprises a first part and a second part, wherein the apparatus is configured to transmit to or receive from the transceiver in the first part with a certain subcarrier spacing, and to receive from or transmit to the transceiver in the second part with a further subcarrier spacing different from the certain subcarrier spacing such that
    the further subcarrier spacing is higher than the certain subcarrier spacing,
    the first part of the subband is used for data transmission to or reception from the transceiver, and
    the second part of the subband is used for substantially immediate control transmission, like a PDGGH or a PUGGH or a PSGGH, including for example a HARQ feedback, to the transceiver without performing LBT.

In accordance with an apparatus for a communication in a wireless communication system, wherein, for a communication with one or more transceivers in the wireless communication system using one or more subbands, the apparatus is configured to
    perform an initial Listen-Before-Talk, LBT, for each subband of the predefined wideband so as to determine from the predefined wideband one or more nonoccupied subbands on which the wideband communication is allowed during a certain transmission time, and wherein during the certain transmission time one or more of the subbands comprises a first part and a second part, wherein the apparatus is configured to transmit to or receive from the transceiver in the first part with a certain subcarrier spacing, and to receive from or transmit to the transceiver in the second part with a further subcarrier spacing different from the certain subcarrier spacing, wherein
    the further subcarrier spacing is higher than the certain subcarrier spacing,
    the first part of the subband is used for data transmission to or reception from the transceiver, and
    the second part of the subband is used for substantially immediate control transmission, like a PDGGH or a PUGGH or a PSGGH, comprising for example a HARQ feedback, to the transceiver without performing LBT. such that the second part of the subband follows the first part immediately or with a gap, the gap being less than a duration of the second part, wherein a gap time may be 16 us at maximum gap time, and the further subcarrier spacing, SGS, may be 60 kHz for the SGS for short control, and wherein the second part may be shorter than the shortest LBT listening window duration.

In accordance with an apparatus for a communication in a wireless communication system, wherein, for a communication with one or more transceivers in the wireless communication system using one or more subbands, the apparatus is configured to perform an initial Listen-Before-Talk, LBT, for each subband of the predefined wideband so as to determine from the predefined wideband one or more nonoccupied subbands on which the wideband communication is allowed during a certain transmission time, and wherein during the certain transmission time one or more of the subbands comprises a first part and a second part, wherein the apparatus is configured to transmit to or receive from the transceiver in the first part with a certain subcarrier spacing, and to receive from or transmit to the transceiver in the second part with a further subcarrier spacing different from the certain subcarrier spacing such that the further subcarrier spacing is configured using, e.g., RRG, or is predefined.

General

In accordance with an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, such that the apparatus comprises a user device, UE, the UE comprising one or more of a mobile terminal, or stationary terminal, or cellular IoT-UE, or vehicular UE, or vehicular group leader (GL) UE, an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator, or the apparatus comprises a base station, the base station comprising one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

System

The present invention provides an example embodiment the as an apparatus for a wideband communication in a wireless communication system, wherein, for a wideband communication with one or more transceivers in the wireless communication system using one or more subbands of a predefined wideband, the apparatus is configured to perform an initial Listen-Before-Talk, LBT, for each subband of the predefined wideband so as to determine from the predefined wideband one or more nonoccupied subbands on which the wideband communication is allowed during a certain transmission time, and during the certain transmission time, transmit to and/or receive from the transceiver using the non-occupied subbands, and 15 wherein, during the certain transmission time and in case the initial LBT indicted that one or more of the subbands are occupied, the apparatus is configured to perform a further LBT for the one or more occupied subbands so as to determine one or more of the initially occupied subbands being no longer occupied, and transmit to and/or receive from the transceiver using, in addition to the initially nonoccupied subbands, the one or more no longer occupied subbands, as a wireless communication system, comprising a plurality of the inventive apparatus.

Methods

1$^{st}$ ASPECT—Signaling of Re-Gained Subbands

The present invention provides a method for a wideband communication in a wireless communication system, the method comprising:

for a wideband communication with one or more transceivers in the wireless communication system using one or more subbands of a predefined wideband, performing an initial Listen-Before-Talk, LBT, for each subband of the predefined wideband so as to determine from the predefined wideband one or more nonoccupied subbands on which the wideband communication is allowed during a certain transmission time, and during the certain transmission time, transmitting to and/or receiving from the transceiver using the non-occupied subbands, and during the certain transmission time and in case the initial LBT indicted that one or more of the subbands are occupied, performing a further LBT for the one or more occupied subbands so as to determine one or more of the initially occupied subbands being no longer occupied, and transmitting to and/or receiving from the transceiver using, in addition to the initially non-occupied subbands, the one or more no longer occupied subbands as a method for a wideband communication in a wireless communication system, the method comprising:

for a wideband communication with one or more transceivers (UE, gNB) in the wireless communication system using one or more subbands of a predefined wideband, performing an initial Listen-Before-Talk, LBT, for each subband of the predefined wideband so as to determine from the predefined wideband one or more non-occupied subbands on which the wideband communication is allowed during a certain transmission time (COT), and during the certain transmission time (COT), transmitting to and/or receiving from the transceiver using the non-occupied subbands, and during the certain transmission time (COT) and in case the initial LBT indicted that one or more of the subbands are occupied, performing a further LBT for the one or more occupied subbands so as to determine one or more of the initially occupied subbands being no longer occupied, and transmitting to and/or receiving from the transceiver using, in addition to the initially non-occupied subbands, the one or more no longer occupied subbands.

2$^{nd}$ ASPECT—LBT-Outcome Reporting

The present invention provides a method for a wideband communication in a wireless communication system, the method comprising:

for a wideband communication with one or more transceivers in the wireless communication system using one or more subbands of a predefined wideband, performing Listen-Before-Talk, LBT, for each subband of the predefined wideband so as to determine from the predefined wideband non-occupied subbands, on which the wideband communication is allowed during a certain transmission time, and occupied subbands, on which the wideband communication is not allowed during the certain transmission time, and during the certain transmission time, transmitting to and/or receiving from the transceiver using the non-occupied subbands, and wherein a plurality of predefined messages is provided, each message associated with one or more certain LBT patterns, the LBT pattern indicating non-occupied and occupied subbands of the predefined wideband, and responsive the LBT indicating a certain LBT pattern, selecting from the plurality of predefined messages a message associated with the certain LBT pattern and to 20 signal the selected message to the one or more transceivers as a method for a wideband communication in a wireless communication system, the method comprising:

for a wideband communication with one or more transceivers (UE, gNB) in the wireless communication system using one or more subbands of a predefined wideband, performing Listen-Before-Talk, LBT, for each subband of the predefined wideband so as to determine from the predefined wideband non-occupied subbands, on which the wideband communication is allowed during a certain transmission time (COT), and occupied subbands, on which the wideband communication is not allowed during the certain transmission time (COT), and during the certain transmission time (COT), transmitting to and/or receiving from the transceiver using the non-occupied subbands, and wherein a plurality of predefined messages is provided, each message associated with one or more certain LBT patterns, the LBT pattern indicating non-occupied and occupied subbands of the predefined wideband, and responsive the LBT indicating a certain LBT pattern, selecting from the plurality of predefined messages a message associated with the certain LBT pattern and to signal the selected message to the one or more transceivers.

3$^{rd}$ ASPECT—Pre-Configured Grant/Assignment for Wideband Operation

The present invention provides a method for a wideband communication in a wireless communication system, wherein for a wideband communication with one or more transceivers of the wireless communication system using one or more subbands of a predefined wideband, a set of wideband configurations is provided, wherein each wideband configuration is associated with a certain Listen-Before-Talk, LBT, pattern, the LBT pattern indicating for the predefined wideband non-occupied subbands, on which the wideband communication is allowed during a certain transmission time, and occupied subbands, on which the wideband communication is not allowed during the certain transmission time, the LBT pattern acquired by the transceiver by performing LBT for each subband of the predefined wideband, and wherein the method comprises:

receiving from the transceiver an indication of the wideband configuration to be used during the certain transmission time, and transmitting, during the certain transmission time, to the transceiver using the wideband configuration indicated by the transceiver as a method for a wideband communication in a wireless communication system, wherein for a wideband communication with one or more transceivers (gNB, UE) of the wireless communication system using one or more subbands of a predefined wideband, a set of wideband configurations is provided, wherein each wideband configuration is associated with a certain Listen-Before-Talk, LBT, pattern, the LBT pattern indicating for the predefined wideband non-occupied subbands, on which the wideband communication is allowed during a certain transmission time (COT), and occupied subbands, on which the wideband communication is not allowed during the certain transmission time (COT), the LBT pattern obtained by the transceiver (gNB, UE) by performing LBT for each subband of the predefined wideband, and wherein the method comprises:

receiving from the transceiver (gNB, UE) an indication of the wideband configuration to be used during the certain transmission time (COT), and transmitting, during the certain transmission time (COT), to the transceiver (gNB, UE) using the wideband configuration indicated by the transceiver.

4$^{th}$ ASPECT—Transmission Preparation, Like PUSCH or PDSCH

The present invention provides A method for a wideband communication in a wireless communication system, the method comprising:

providing a set of wideband configurations for a wideband communication with one or more transceivers of the wireless communication system using one or more subbands of a predefined wideband, each wideband configuration indicating a number of subbands from the predefined wideband to be used for the wideband communication, after receiving from the transceiver an implicit or explicit indication of the wideband configuration to be used and a grant for a transmission to the transceiver, preparing a plurality of transmissions, each transmission comprising a different number of subbands and/or different patterns of subbands (e.g., different subband patterns distinguishing, e.g., also the frequency) from the indicated wideband configuration, and performing Listen-Before-Talk, LBT, to acquire a LBT pattern, the LBT pattern indicating for the predefined wideband non-occupied subbands, on which the wideband communication is allowed during a certain transmission time, and occupied subbands, on which the wideband communication is not allowed during the certain transmission time, wherein the wideband configuration may be the full wideband or a configuration comprising a subset of subbands signaled by the transceiver, selecting a prepared transmission which fulfils one or more certain criteria or fits the LBT pattern best, and transmitting, during the certain transmission time, the selected transmission to the transceiver as a method for a wideband communication in a wireless communication system, the method comprising:

providing a set of wideband configurations for a wideband communication with one or more transceivers (gNB, UE) of the wireless communication system using one or more subbands of a predefined wideband, each wideband configuration indicating a number of subbands from the predefined wideband to be used for the wideband communication, after receiving from the transceiver (gNB, UE) an implicit or explicit indication of the wideband configuration to be used and a grant for a transmission to the transceiver, preparing a plurality of transmissions, each transmission including a different number of subbands and/or different patterns of subbands (e.g., different subband patterns distinguishing, e.g., also the frequency) from the indicated wideband configuration, and performing Listen-Before-Talk, LBT, to obtain a LBT pattern, the LBT pattern indicating for the predefined wideband non-occupied subbands, on which the wideband communication is allowed during a certain transmission time (COT), and occupied subbands, on which the wideband communication is not allowed during the certain transmission time (COT), wherein the wideband configuration may be the full wideband or a configuration comprising a subset of subbands signaled by the transceiver, selecting a prepared transmission which fulfils one or more certain criteria or fits the LBT pattern best, and transmitting, during the certain transmission time (COT), the selected transmission to the transceiver (gNB, UE).

5$^{th}$ ASPECT—Control Channel Monitoring Enabling for not-Won Subbands

The present invention provides a method for a wideband communication in a wireless communication system, the method comprising:

for a wideband communication with one or more transceivers in the wireless communication system using one or more subbands of a predefined wideband, performing initial Listen-Before-Talk, LBT, for each subband of the predefined wideband so as to determine from the predefined wideband one or more nonoccupied subbands on which the wideband communication is allowed during a certain transmission time, and during the certain transmission time, transmitting to and/ or receiving from the transceiver using the non-occupied subbands, during the certain transmission time and in case the initial LBT indicated that one or more of the subbands are occupied, configuring the transceiver to monitor the occupied subbands as a method for a wideband communication in a wireless communication system, the method comprising:

for a wideband communication with one or more transceivers (UE, gNB) in the wireless communication system using one or more subbands of a predefined wideband, performing initial Listen-Before-Talk, LBT, for each subband of the predefined wideband so as to determine from the predefined wideband one or more non-occupied subbands on which the wideband communication is allowed during a certain transmission time (COT), and during the certain transmission time (COT), transmitting to and/or receiving from the transceiver using the non-occupied subbands, during the certain transmission time (COT) and in case the initial LBT indicated that one or more of the subbands are occupied, configuring the transceiver to monitor the occupied subbands.

The present invention provides a method for a wideband communication in a wireless communication system, the method comprising:

for a wideband communication with one or more transceivers in the wireless communication system using one or more subbands of a predefined wideband, receiving from the transceiver an indication of non-occupied subbands of the predefined wideband, on which wideband communication is allowed during a certain transmission time, the non-occupied subbands, acquired by the transceiver by performing LBT for each subband of the predefined wideband, and transmitting, during the certain transmission time, to the transceiver using the nonoccupied subbands of the predefined wideband, further receiving from the transceiver an indication of occupied subbands of the predefined wideband, and monitoring the occupied subbands as a method for a wideband communication in a wireless communication system, the method comprising:

for a wideband communication with one or more transceivers (UE, gNB) in the wireless communication system using one or more subbands of a predefined wideband, receiving from the transceiver an indication of non-occupied subbands of the predefined wideband, on which wideband communication is allowed during a certain transmission time (COT), the non-occupied subbands, obtained by the transceiver (gNB, UE) by performing LBT for each subband of the predefined wideband, and transmitting, during the certain transmission time (COT), to the transceiver using the non-occupied subbands of the predefined wideband, further receiving from the transceiver an indication of occupied subbands of the predefined wideband, and monitoring the occupied subbands.

6$^{th}$ ASPECT—Appending of Punctured Parts

The present invention provides A method for a wideband communication in a wireless communication system, the method comprising:

for a wideband communication with one or more transceivers in the wireless communication system using one or more subbands of a predefined wideband, performing an initial Listen-Before-Talk, LBT, for each subband of the predefined wideband so as to determine from the predefined wideband one or more nonoccupied subbands on which the wideband communication is allowed during a certain transmission time and occupied subbands, on which the wideband communication is not allowed during the certain transmission time, wherein the transmission comprises one or more first parts associated with one or more non-occupied subbands and one or more second parts associated with one or more occupied subbands, and transmitting the one or more first parts of the transmission using the one or more nonoccupied subbands, and appending the one or more second parts of the transmission to the one or more non-occupied subbands as a method for a wideband communication in a wireless communication system, the method comprising:

for a wideband communication with one or more transceivers (UE, gNB) in the wireless communication system using one or more subbands of a predefined wideband, performing an initial Listen-Before-Talk, LBT, for each subband of the predefined wideband so as to determine from the predefined wideband one or more non-occupied subbands on which the wideband communication is allowed during a certain transmission time (COT) and occupied subbands, on which the wideband communication is not allowed during the certain transmission time (COT), wherein the transmission includes one or more first parts associated with one or more non-occupied subbands and one or more second parts associated with one or more occupied subbands, and transmitting the one or more first parts of the transmission using the one or more non-occupied subbands, and appending the one or more second parts of the transmission to the one or more non-occupied subbands.

7$^{th}$ ASPECT—Separate Subcarrier Spacing (SCS) Fast Control without LBT

The present invention provides a method for a wideband communication in a wireless communication system, the method comprising:

for a communication with one or more transceivers in the wireless communication system using one or more subbands, performing an initial Listen-Before-Talk, LBT, for each subband of the predefined wideband so as to determine from the predefined wideband one or more nonoccupied subbands on which the wideband communication is allowed during a certain transmission time, and wherein during the certain transmission time one or more of the subbands comprises a first part and a second part, wherein the method comprises transmitting to or receiving from the transceiver in the first part with a certain subcarrier spacing, and receiving from or transmitting to the transceiver in the second part with a further subcarrier spacing different from the certain subcarrier spacing.

Computer Program Product

The present invention provides a computer program product comprising instructions which, when the program is executed by a computer, causes the computer to carry out one or more methods in accordance with the present invention.

1$^{st}$ ASPECT—Signaling of Re-Gained Subbands

In accordance with this aspect, embodiments of the present invention allow using initially busy or occupied subbands, non-won subbands, for the wideband communication in case they become available during the transmission time gained by the transmitter, like the COT. For example, a communication by another communication system on a certain subband may end during the COT so that this band is no longer occupied and may be regained for the wideband communication. If this occurs, the entity that initiated the wideband communication, for example the gNB or the UE, may signal to the respective communication partner(s), like the UE(s) or the gNB(s) or any other transceiver, that one or more initially occupied subbands are regained and that the transmission may now also occur on these regained subbands.

Figure 6:
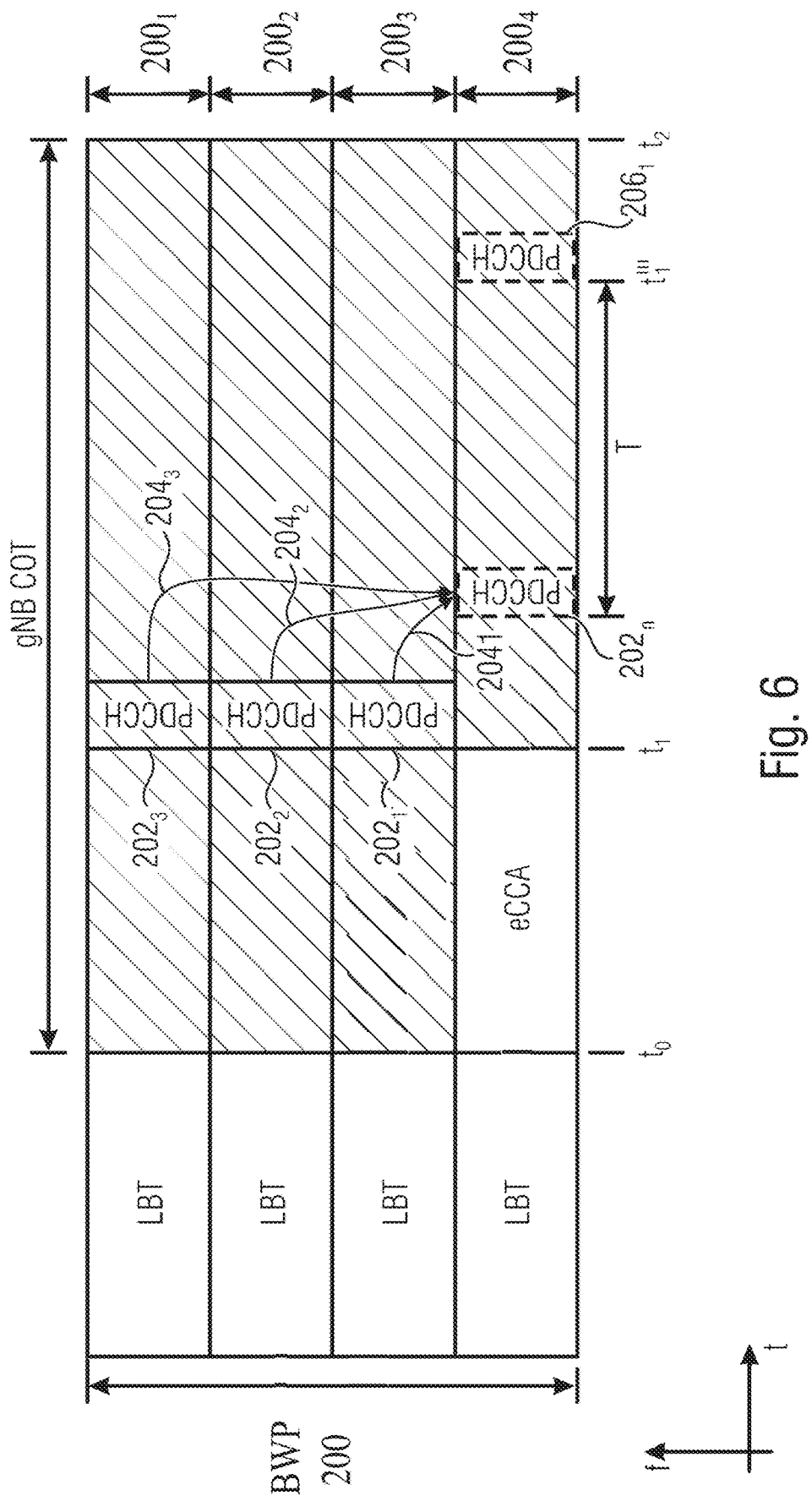
FIG. 6 illustrates an embodiment of a first aspect of the present invention in which a transmitter, like a gNB, is to perform a wideband operation over a set of scheduled resources.

FIG. 6 illustrates an embodiment of the first aspect of the present invention in which a transmitter, like a gNB, is to perform a wideband operation over a set of scheduled resources, for example, over a scheduled BWP 200 for a certain channel occupancy time, COT. In a similar way as in FIG. 4, the BWP 200 may span four subbands $200_1$ to $200_4$ each having a certain bandwidth, for example 20 MHZ, so that the wideband operation is over an 80 MHz band. Initially, the gNB performs on each of the subbands $200_1$ to $200_2$ respective LBTs, as is indicated in FIG. 6 at the right hand side. The respective LBTs yield that, initially, i.e., at a time $t_0$, among the subbands only subbands $200_2$ to $200_4$ are free or non-occupied, i.e., may be used for the wideband transmission by the gNB. The LBT carried out for the subband $200_1$ yields, however, that this subband at the time $t_0$ is not free or is occupied, i.e., may not be used for the transmission. In accordance with the first aspect of the present invention, the gNB continues performing the LBT on the non-won subband $200_1$, for example by performing an extended CCA check for band $200_1$, in a way as discussed above with reference to FIG. 3 which, in the depicted embodiment yields that at a time $t_1$ the subband $200_1$ is no longer occupied and, therefore may be used for the wideband operation of the gNB. Responsive to detecting the availability of the subband $200_1$, the gNB may signal this to the receiver(s), like the UE(s) to which the wideband operation is directed, for example, by providing respective information in a downlink control message transmitted over one or more of the initially free subbands. In the embodiment of FIG. 6, in each of the initially free subbands $200_2$ to $200_4$ a PDCCH $202_1$ to $202_3$ may be transmitted indicating to the receiver respective resources in the no longer occupied subband $200_1$ at which data for the receiver is also transmitted. This pointing to the respective resources is schematically represented by the respective arrows $204_1$ to $204_3$ pointing from the respective PDCCHs to the no longer occupied subband $200_1$.

Although FIG. 6 illustrates an embodiment in which the transmitter is a base station or gNB, it is noted that the same approach may be applied when the transmitter is a user device, like a UE transmitting, for example, to a gNB. In this case, the UE may signal to the gNB that an initially occupied subband is now available, and that data is also transmitted on the no longer occupied subband by providing respective information, for example, in a way as described in FIG. 6 in the respective subbands $200_2$ to $200_4$.

Although FIG. 6 illustrates transmitting the respective information $202_1$ to $202_3$ in each of the initially non-occupied subbands, this information may be transmitted only in a subset of the initially available subbands. Moreover, instead of indicating in the initially non-occupied subbands, the resources in the no longer occupied subband now also used for the transmission, in accordance with other embodiments the control message $202_1$ to $202_3$ may only indicate to the receiver to also monitor the no longer occupied subband $200_1$ for a control message, as is indicated by PDCCH $202_4$ transmitted in no longer occupied subband $200_1$.

Thus, in accordance with the first aspect of the present invention, the transmitter, like the gNB, continues performing LBT on the not won subbands during the gNB COT, i.e., on those subbands for which the initial LBT indicated that they are occupied or busy. In case one or more new/extra subbands are won/gained within the gNB-COT, like subband $200_1$ in FIG. 6, the gNB may transmit also on this/these newly gained subbands. Once the availability of the new subband, like subband $200_1$ is determined, the gNB starts transmitting on the new subband in addition to the already won subbands $200_2$ to $200_4$.

In accordance with embodiments, the gNB may transmit using one of the following two methods:
aligned-ending COTs:
until the end of the gNB COT, or
non-aligned ending COTs:
the new COT, based on the LBT performed for gaining this subband, may last
longer or shorter than the original COTs.

FIG. 6 illustrates an embodiment in which the new subband $200_1$ ends aligned with the gNB COT of the original subbands $200_2$ to $200_4$.

Figure 7:
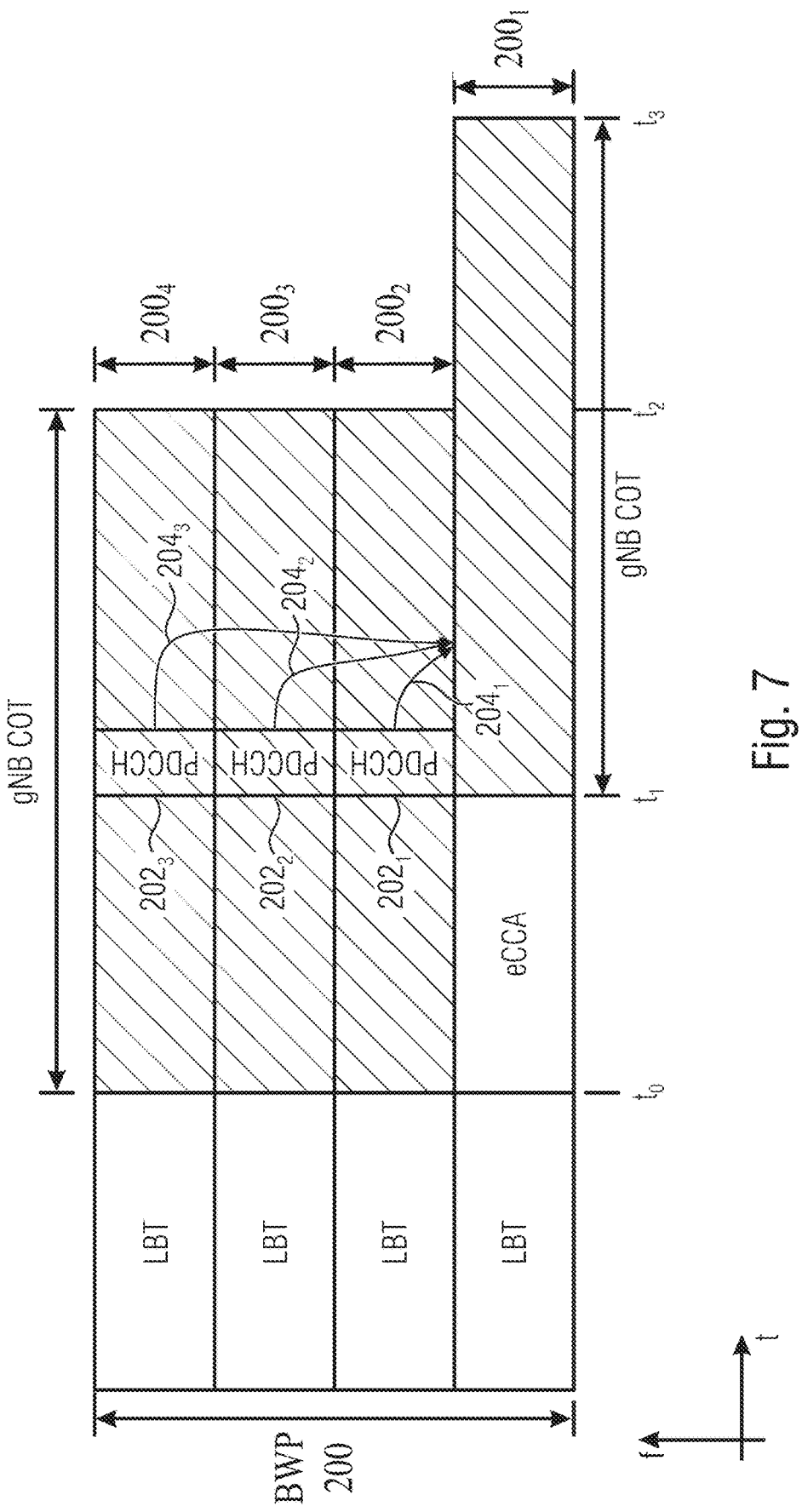
FIG. 7 illustrates an embodiment in which a regained subband has its own, new COT that is independent of the initial COTs for the initially used subbands.

FIG. 7 illustrates an embodiment in which the new subband $200_1$ has its own, new gNB COT that is independent of the other gNB COTs for the initially used subbands $200_2$ to $200_4$. In the embodiment of FIG. 7, the COT on the newly gained or no longer occupied subband $200_1$ is longer than the COT in the initial subbands. More specifically, as is shown in FIG. 7, the initial or original gNB COT extends from $t_0$ to $t_2$, while the COT associated with the regained or no longer occupied subband $200_1$ lasts from $t_1$ to $t_3$.

In accordance with embodiments within the already used COTs, for example the COTs for subbands $200_2$ to $200_4$, it is indicated/signaled, for example, using GC-PDCCH, to the receivers, like UEs, which are also operating on the wideband, that the new subband $200_1$ is now available for wideband operation. Such a signaling may indicate a specific allocation or subband size, for example in cases the subband size is not fixed to the above example of 20 MHz as used in 5 GHz carrier frequency bands.

Figure 8:
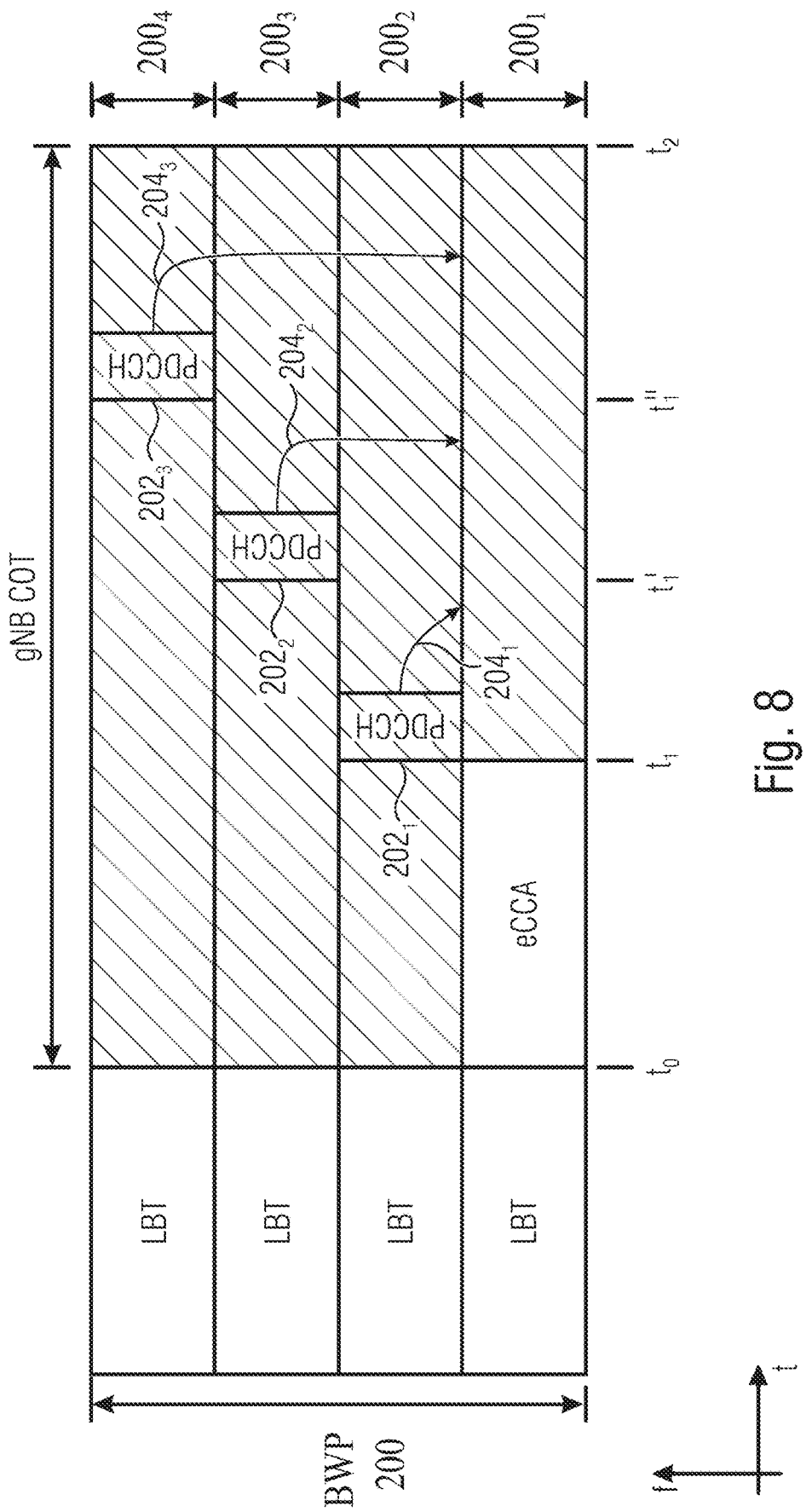
FIG. 8 illustrates a situation similar to FIG. 6 in which a newly gained subband is aligned with an initial COT, however, the signaling of the availability of the new, no longer occupied subband occurs at different times on the different initial subbands.

In FIG. 6 and FIG. 7, embodiments have been depicted in which the respective PDCCHs $202_1$ to $202_3$ are transmitted in the initially gained subbands $200_2$ to $200_4$ at substantially the same time, however, the invention is not limited to such embodiments, rather, in the respective initially gained subbands less than all subbands may be used for transmitting the PDCCHs. Further, the PDCCHs may be signaled at different times, as is schematically illustrated in FIG. 8 depicting a situation similar to FIG. 6 in which a newly gained subband $200_1$ is aligned with the initial gNB-COT, however, the signaling of the availability of the new, no longer occupied subband $200_1$ occurs at different times on the different initial subbands $200_2$ to $200_4$. More specifically, as is depicted in FIG. 8, once it has been determined that subband $200_1$ is now also available at time $t_1$, a first PDCCH $202_1$ may be transmitted at the same time $t_1$ or at a later time in the first initially free or non-occupied subband $200_2$. In the other initially used subbands $200_3$ to $200_4$, the respective PDCCHs $202_2$ and $202_3$ may be transmitted at different times following the initial transmission of the PDCCH $202_1$, for example in the subband $200_3$ at a time $t_1'$ which is later than the time $t_1$, and in the subband $200_4$, at a time $t_1''$ which is longer than the time $t_1$ and $t_1'$.

With regard to the above-described embodiments of FIG. 6, FIG. 7 and FIG. 8, it is noted that they have been described in on environment in which a wideband operation is between a transmitter, like a gNB or a UE, and a receiver, like a UE and a gNB. However, the invention is not limited to a communication among a gNB or base station and a user device, like a UE, rather, the above-described principles may equally be applied for a device-to-device communication, like a D2D, V2V, V2X communication. In such scenarios, the communication is over a sidelink between the respective devices. The transmitter is a first UE and the receiver is a second UE.

In accordance with embodiments of the first aspect, the receiver of the wideband communication from the transmitter may send, within the transmitter's COT, a transmission from the receiver to the transmitter. For example when considering a situation in which the gNB is the transmitter, within the gNB COT indicated in FIG. 6 to FIG. 8, the receiver, like the UE may transmit on one more of the subbands an uplink transmission from the UE to the gNB, for example some feedback information about the downlink transmission or the like. In accordance with the first aspect, for such a transmission back to the transmitter, like an uplink, a regained subband switching timer for the uplink in the wideband operation may be provided. More specifically, the receiver may wait for a certain time before transmitting on the regained or no longer occupied subband, for example for preparing a transmission on the no longer occupied subband, like a rate matching procedure. The ability of transmitting on no longer occupied subbands may be activated or deactivated by (pre-) configuration or may be a UE capability of the receiver, which is indicated to the transmitter, e.g. during connection setup. For example, when considering a UE being the receiver in a wideband operation as explained above with reference to FIG. 6 to FIG. 8, the UE may not transmit an uplink transmission, like a PUSCH, in the newly gained subband $200_1$ directly after the LBT indicated the availability of the subband. The UE may wait for a timer T, which may be a pre-configured timer or a timer configured by a DCI message or the like, after which the UE transmits on the regained subband $200_1$. Such a situation is schematically represented in FIG. 6 illustrating for the regained subband $200_1$ the PUSCH $206_1$ that is transmitted at a time $t_1''$ that follows a time period T after the UE or receiver obtained from the transmitter the indication that the new subband $200_1$ is available, for example for a time T as indicated by the mentioned timer from the receipt of the PDCCH $202_4$ in the regained subband $200_1$. Thus, the timer starts, in accordance with embodiments, directly after the indication or signaling of the existence of the regained subband $200_1$. The time T may be used for performing rate-matching or for preparing a longer, wideband PUSCH, i.e., the PUSCH $206_1$ indicated in FIG. 6 may span also across one or more of the initially available subbands $200_2$ to $200_4$.

In accordance with further embodiments of the first aspect, the control message, like the PDCCH depicted in FIG. 6, may include a DCI which signals the gained subbands, like subband $200_1$, which is no longer occupied, for example by setting a corresponding bit in a subband field of the DCI. The DCI may also signal, by respective bits, a maximum number of bits used for signaling in the subband field the regained subbands. The subsequently indicated tables indicate examples for signaling in an DCI the available subbands from a plurality or a maximum number of subbands for the wideband operation. The first three tables indicate the possible signaling using a two-bit subband field, so that the DCI may indicate the maximum number of bits for signaling the subbands to be two, and a certain combination of bits as indicated in the first three tables indicates the respective subbands available for the wideband communication. The fourth table indicates an example for signaling the available subbands using three bits, i.e., the DCI signals the maximum number of bits to be used for signaling to be three, and by the respective combination of three bits as indicated in the table the available/non-available subbands are signaled.

TABLE 1

| | LBT-subbands used for wideband operation (W—non-occupied or won or used/transmitting, L—occupied or lost or not used/not transmitting) |
|---|---|
| 00 | WWWW |
| 01 | WWWL/LWWW |
| 10 | LLWW/WWLL |
| 11 | LWWL |

Exemplary LBT-Patterns Reported in, e.g., DL Control Information (DCI)

TABLE 2

| | LBT-subbands used for wideband operation (W—non-occupied or won or used/transmitting, L—occupied or lost or not used/not transmitting) |
|---|---|
| 00 | WWWW |
| 01 | WWWL/LWWW |
| 10 | LLWW/WWLL/LWWL |
| 11 | WLLL/LWLL/LLWL/LLLW |

Exemplary LBT-Patterns Reported in, e.g., DL Control Information (DCI)

TABLE 3

| | LBT-subbands used for wideband operation (W—non-occupied or won or used/transmitting, L—occupied or lost or not used/not transmitting) |
|---|---|
| 00 | WWWW/WLLL/LLLW |
| 01 | WWWL/LWWW |
| 10 | LLWW/WWLL/LWWL |
| 11 | LWLL/LLWL |

Exemplary LBT-Patterns Reported in, e.g., DL Control Information (DCI)

TABLE 4

| | LBT-subbands used for wideband operation (W—non-occupied or won or used/transmitting, L—occupied or lost or not used/not transmitting) |
|---|---|
| 000 | WWWW |
| 001 | LWWW |
| 010 | WWWL |
| 011 | LLWW |
| 100 | WWLL |
| 101 | LWWL |
| 110 | LLWL |
| 110 | LWLL |
| 111 | WLLL/LLLW |

Exemplary LBT-Patterns Reported in, e.g., DL Control Information (DCI)

Figure 9:
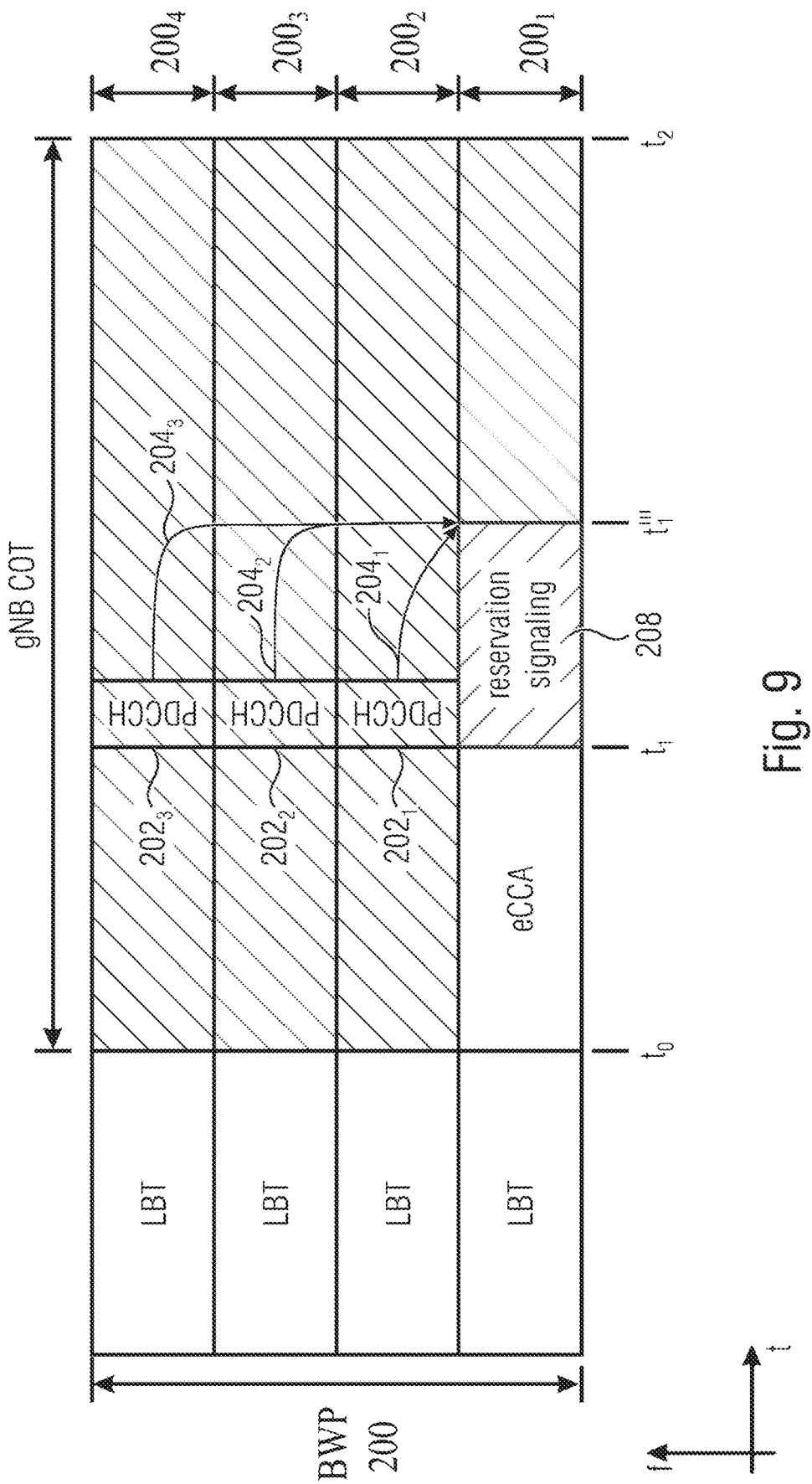
FIG. 9 illustrates an embodiment of the first aspect of the present invention illustrating the reservation signaling at the beginning of a newly gained subband.

In accordance with further embodiments of the first aspect of the present invention, the transmitter, for example the gNB or the UE, which regained initially occupied subbands for the wideband operation may transmit a reservation signal at the beginning of the transmission time associated with a no longer occupied subband so as to make sure that the subband is reserved for the wideband operation. FIG. 9 illustrates an embodiment of the first aspect of the present invention illustrating the reservation signaling at the beginning of a newly gained subband. FIG. 9 shows an embodiment similar to one of FIG. 6 in which the COT of the newly gained subband $200_1$ is aligned with the COTs of the originally used subbands $200_2$ to $200_4$. FIG. 9 illustrates at 208 a reservation signaling transmitted by the transmitter, like the gNB, that is transmitted at the very beginning of the COT of the newly gained subband $200_1$ so as to reserve the subband, for example in case there is no UE that can be scheduled initially. For example, in the situation depicted in FIG. 9, by means of the PDCCHs $202_1$ to $202_3$, the scheduling for a UE to use resources in the regained subband $200_1$ does not occur before the time $t_1''$, which is some time after time $t_1$ at which the availability of no longer occupied subband $200_1$ has been identified. Thus, a data transmission towards the UE only starts at time $t_1'''$, and to avoid that other, coexisting communication systems also using subband $200_1$ perform a transmission on this subband, the gNB transmits the reservation signaling, so that subband $200_1$ starting out from $t_1$ is recognized by other communication systems to be busy or occupied so that they do not transmit on this subband and it can be used for the wideband operation of the gNB in accordance with the inventive approach.

Regarding FIG. 9, it is noted that the reservation signal may also be applied in the other embodiments described above, namely in combination with the embodiments of FIG. 6, FIG. 7 and FIG. 8.

$2^{nd}$ ASPECT—LBT-Outcome Reporting

In accordance with this aspect, embodiments of the present invention provide an approach for an improved reporting about the outcome of the LBT as initiated by the transmitter, for example, the base station, gNB or the user device, UE. For example, in case of a UE-initiated wideband operation employing a certain COT, the LBT procedure may result in a failure on a subset of the LBT subbands, i.e., on one or more subbands which may be occupied or busy. As described above with reference to the first aspect, such failure is to be signaled in a respective control message to the receiver. When considering a UE initiated wideband operation the receiver is a base station. An issue to be considered for such a UE-initiated wideband operation is that preparing the PUSCCH or the PUSCH involves some preparation time. The time available for preparing such signaling is limited, as during the preparation time no transmission from the UE in the uplink occurs so that the subbands which have been newly won by the UE and which may also be used by coexisting communication systems appear to such coexisting systems to be free or non-occupied. A coexisting system may start a communication on that subband which, initially, had been won by the UE currently preparing the signaling towards the gNB, e.g., for indicating which of the subbands are used for the wideband operation. Thus, the transmitter, like the UE, may not have sufficient time $t_0$ prepare a messaging or signaling, like a PUCCH or a PUSCH transmission, including a single bit to signal the availability for each subband of the original configured or preconfigured number of subbands within an active BWP spanning a wider bandwidth due to the too large number of bits that may be used. For example, in case for four subbands are configured, the transmitter would transmit four bits each bit indicating the LBT outcome of the respective subband. This would involve using a PUCCH format other than format zero, which involve more preparation time.

To address this issue, in accordance with embodiments of the second aspect of the present invention, rather than generating the signaling after the completion of the LBT procedure, the transmitter, like the UE, holds a plurality of predefined messages associated with respective LBT patterns indicating occupied and non-occupied subbands in the wideband to be used for the wideband operation. Thus, once the LBT procedure is completed and the number of subbands from the overall wideband available for the communication are known, the transmitter, like the UE, may select a suitable one of the predefined messages for immediately signaling to the gNB those subbands that are used by the UE for the uplink communication. In accordance with embodiments, the general wideband configuration, i.e., the number of subbands forming the wideband for the wideband operation may be configured or preconfigured in the system, so that in accordance with embodiments the predefined messages may only indicate those subbands of the predefined wideband which are occupied and those which are non-occupied. In other embodiments, only those non-occupied subbands are signaled or indicated in the messages which are actually used to transmit to and/or receive from the transceiver, like the gNB. The actually available and used subbands may be signaled, for example, in case of an uplink transmission from the UE to the gNB which prefers to use continuous subbands for the transmission (see FIG. 4 (b)). In accordance with yet other embodiments, the respective messages may indicate the non-occupied and occupied subbands as well as those non-occupied subbands which are actually used for a transmission, for example again in a case the uplink transmission uses a number of continuous subbands.

Figures 10A, 10B:
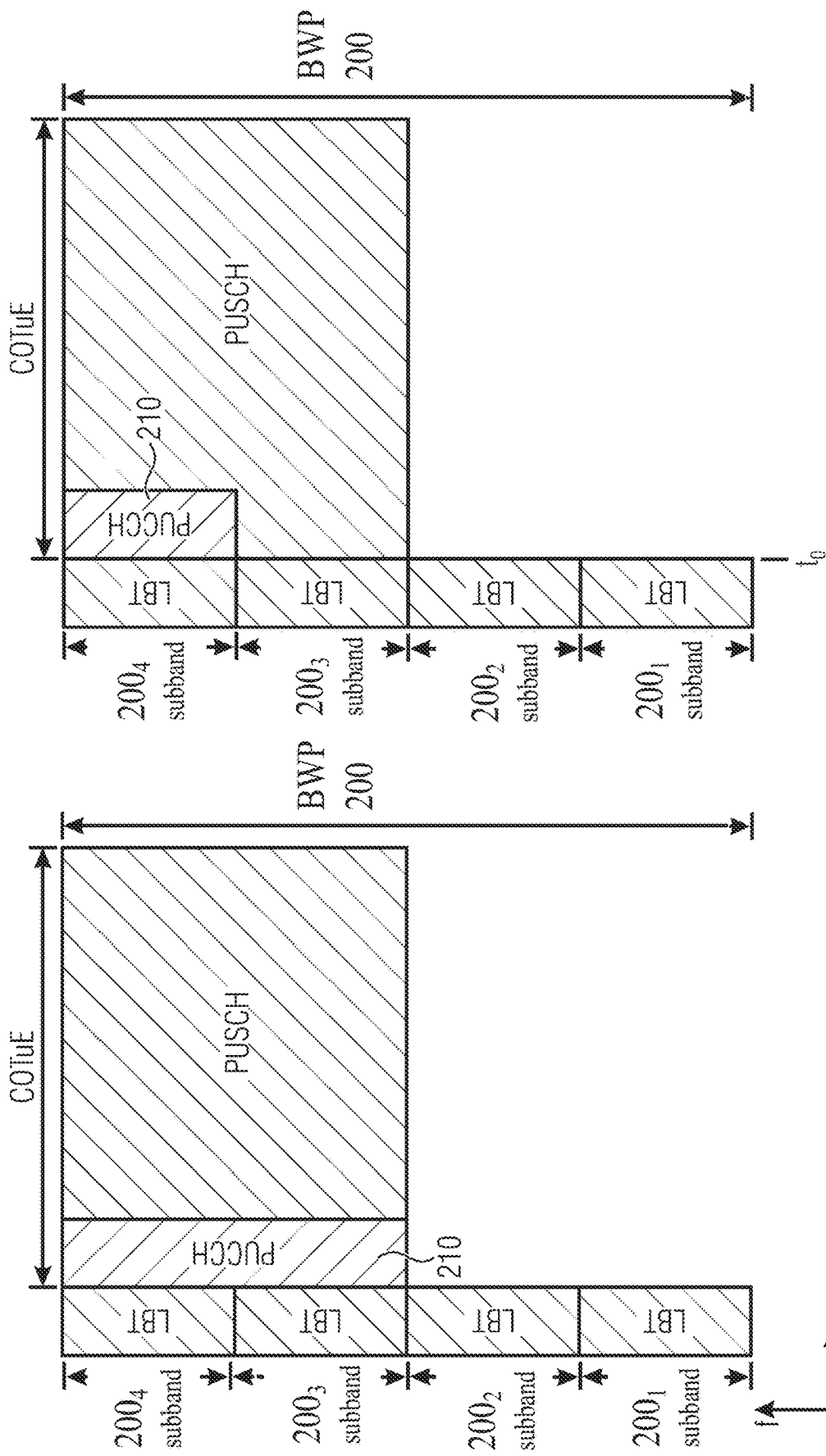

FIG. 10 illustrates embodiments of the second aspect of the present invention for reporting the LBT outcome in an uplink signaling, like a PUSCCH. FIG. 10 assumes a situation in which the wideband operation has been initiated by a UE, i.e., the depicted embodiments relate to an uplink communication from a UE towards a gNB. In a similar way as in FIG. 6 to FIG. 9, a preconfigured wideband operation is assumed using a BWP 200 including four subbands $200_1$ to $200_4$ of, for example, the same bandwidth, like 20 MHz.

FIG. 10 (a) illustrates an embodiment in which the UE performs for each of the subbands $200_1$ to $200_4$ the LBT algorithm which, in the depicted embodiment, yields that LBT subbands $200_3$ and $200_4$ are not busy, i.e., are free or non-occupied and may be used for the broadband communication towards the gNB, for a channel occupancy time $COT_{UE}$. Following, the LBT procedure, at the time $t_0$, i.e., at the beginning of the $COT_{UE}$ a control signaling, like PUCCH 210 is signaled, more specifically, for the pattern of available subbands shown in FIG. 10 (a) a suitable PUCCH 210 is selected from a plurality of predefined control messages and transmitted immediately after the LBT process so as to signal to the gNB those subbands, namely subbands $200_3$ and $200_4$, which are used for the uplink transmission PUSCH. In the embodiment of FIG. 10 (a), subbands $200_1$ and $200_2$ are determined by the LBT process to be busy or occupied and, therefore, are not used for the uplink communication. As mentioned above, in accordance with certain embodiments, for the uplink communication it may be desired to use continuous subbands. Thus, FIG. 10 (a) also covers a situation in which, for example, also LBT subband $200_1$ has been found to be available, i.e., non-occupied, however, due to the requirement to use continuous subbands only the available subbands or non-occupied subbands $200_3$ and $200_4$ shown in FIG. 10 (a) are actually used for the uplink communication towards the gNB. In the embodiment of FIG. 10 (a), the signaling regarding the LBT pattern that is used for the uplink by the UE is transmitted in a common message spanning the two available subbands $200_3$ and $200_4$.

FIG. 10 (b) shows an embodiment, similar to the one of FIG. 10 (a), except that the signaling of the LBT pattern that is used by the UE for the uplink is only signaled by a PUCCH 210 in one of the used or non-occupied subbands, and the depicted embodiment only in the subband $200_4$. In other embodiments, rather than transmitting the PUCCH 210 in subband $200_4$, it may be transmitted in subband $200_3$.

FIG. 10 (c) shows another embodiment, again similar to the embodiments of FIG. 10 (a) and FIG. 10 (b). In accordance with the embodiment of FIG. 10 (c), in each of the won or used subbands for the uplink communication, namely in each of subbands $200_3$ and $200_4$ a respective signaling selected from the predefined messages is transmitted, as is indicated by the PUCCH $210_1$ and $210_2$.

FIG. 10 (d) shows yet another embodiment in which it is assumed that only subband $200_2$ is not available for the wideband communication by the UE towards the gNB, and, in addition, it is assumed that for the uplink also non-continuous subbands may be used. In accordance with this embodiment, the uplink communication PUSCH is performed in each of the non-occupied subbands $200_1$, $200_3$ and $200_4$, while subband $200_2$ has been found by the LBT algorithm to be occupied or busy. In a similar way as in the embodiment of FIG. 10 (c), a respective PUCCH is selected for each subband and transmitted in each subband, as is indicated by PUCCHs $210_1$ to $210_3$. It is noted that in the embodiment of FIG. 10 (d), the respective signaling messages for signaling the actual LBT subbands to be used may be selected from the above-mentioned predefined plurality of messages so that the UE does not need to prepare the PUCCH, rather it selects one or more appropriate predefined messages for transmission. In accordance to further embodiments, instead of transmitting a PUCCH in each of the subbands, also the approach as described with reference to FIG. 10 (a) and FIG. 10 (b) may be employed.

Thus, in accordance with the above-described embodiments, the number of acquired subbands, i.e., non-occupied or free subbands, or the LBT pattern may be signaled using predefined messages, which may include messages having a short PUCCH length or format, for example, with a sequence-based encoding using a PUCCH format 0. Sequence-based encoding means that each possible signaling state is associated with a predefined signal sequence, and the encoder simply chooses the predefined signal sequence based on the state that is to be signaled. On the other hand, a non-sequence-based encoding involves providing a generator matrix or parity check matrix and the code word, namely the output sequence, is calculated on the basis of the input so that the possible output sequences are not know per se but have to be computed by a certain mathematical representation. This process involves more time than simply selecting predefined messages and, therefore, may result in the above situation that an initially gained or acquired subband does not receive any transmission at the time $t_0$ so that it may be considered by a coexisting system to be free and may then be used by this coexisting system for transmission. Using the predefined messages avoids such a situation and makes sure that the UE or the transmitter may start using the gained or acquired subbands for the wideband transmission immediately following the LBT procedure. The UE may prepare signals for some or all possible states in advance and chose their appropriate sequence after performing the LBT, as explained above, thereby avoiding waiting times after the LBT results are available.

In accordance with further embodiments of the second aspect of the present invention, the LBT reporting, i.e., the signaling of the acquired subbands or the signaling of the LBT pattern obtained from the LBT procedure, may make use of states which may indicate multiple possible transmission patterns. Patterns may are associated with a common state such that they are easily distinguishable from each other, for example, by utilizing a power sensing or a DMRS detection. Furthermore, the patterns associated with a common sense may also be associated to a high probability outcome together with a low probability outcome. In this way, the number of actual states to be signaled is reduced, thereby reducing or minimizing the reporting burden on the UE or the transmitter as less messages are to be stored and prepared, for example less bit sequences. In accordance with embodiments, the respective patterns may be indicated by a plurality of bits, for example by two or three bits representing certain, predefined LBT patterns.

The tables below illustrate embodiments for reporting LBT-patterns in a control message, like a UCI for an uplink communication or a DCI for a downlink communication wherein the receptive UCI/DCI include, for example, subband fields of a predefined bit length and in which the respective bits are set as shown in the tables below. The first three tables indicate the possible signaling using a two-bit subband field, so that the UCI may indicate the maximum number of bits for signaling the subbands to be two, and a certain combination of bits as indicated in the first three tables indicates the respective subbands available for the wideband communication. The fourth table indicates an example for signaling the available subbands using three bits, i.e., the UCI signals the maximum number of bits to be used for signaling to be three, and by the respective combination of three bits as indicated in the table the available/non-available subbands are signaled.

TABLE 1

| | LBT-subbands used for TX (W—non-occupied or won or used/transmitting, L—occupied or lost or not used/not transmitting) |
|---|---|
| 00 | WWWW |
| 01 | WWWL/LWWW |
| 10 | LLWW/WWLL |
| 11 | LWWL |

Exemplary LBT-Patterns Reported in, e.g., UL Control Information (UCI)

TABLE 2

| | LBT-subbands used for TX (W—non-occupied or won or used/transmitting, L—occupied or lost or not used/not transmitting) |
|---|---|
| 00 | WWWW |
| 01 | WWWL/LWWW |
| 10 | LLWW/WWLL/LWWL |
| 11 | WLLL/LWLL/LLWL/LLLW |

Exemplary LBT-Patterns Reported in, e.g., UL Control Information (UCI)

TABLE 3

| | LBT-subbands used for TX (W—non-occupied or won or used/transmitting, L—occupied or lost or not used/not transmitting) |
|---|---|
| 00 | WWWW/WLLL/LLLW |
| 01 | WWWL/LWWW |
| 10 | LLWW/WWLL/LWWL |
| 11 | LWLL/LLWL |

Exemplary LBT-Patterns Reported in, e.g., UL Control Information (UCI)

TABLE 4

| | LBT-subbands used for TX (W—non-occupied or won or used/transmitting, L—occupied or lost or not used/not transmitting) |
|---|---|
| 000 | WWWW |
| 001 | LWWW |
| 010 | WWWL |
| 011 | LLWW |
| 100 | WWLL |
| 101 | LWWL |
| 110 | LLWL |
| 110 | LWLL |
| 111 | WLLL/LLLW |

Exemplary LBT-Patterns Reported in, e.g., UL Control Information (UCI)

With regard to the second aspect of the present invention it is noted that the above embodiments have been mainly described with reference to an uplink communication from a user device, like a UE, to a base station, like a gNB. However, the present invention is not limited to such uplink communication, rather, the principles underling the second aspect of the present invention may be equally applied for a downlink communication from a base station, like a gNB, to a user device, like a UE. Also, the principles may be applied, as in the first aspect, for a communication among user devices, like a D2D, V2V, V2X communication using a sidelink wideband communication over a plurality of subbands.

$3^{rd}$ ASPECT—Pre-Configured Grant/Assignment for Wideband Operation

In accordance with this aspect, embodiments of the present invention provide for a wideband operation between a transmitter and a receiver, in which the receiver includes a plurality of predefined wideband configurations and, during the wideband operation, receives from the transmitter an indication of the actual wideband configuration to be used for the wideband operation and to use the indicated wideband configuration for a transmission to the receiver.

For example, in a gNB initiated wideband operation, the UE may receive from the gNB a wideband grant or assignment that is based on the preconfigured wideband operation, and the UE expects those subbands to be used for the PDCSH or PUSCH only on the non-occupied subbands, although a wideband operation is indicated. The UE then punctures or rate matches the transmissions to be performed towards the gNB based on the signaled wideband configuration to be used either using a continuous or a non-continuous frequency allocation. In accordance with embodiments, the gNB may configure the UE with a set of wideband configurations including respective subband patterns, and for the uplink within the gNB COT, the gNB may explicitly indicate in the uplink grant the PUSCH configuration to be used in order to accommodate to the fact that some of the subbands, which are basically configured for the wideband operation, are not available, i.e., have been considered by the gNB to be occupied. The configuration as indicated by the gNB does not include the occupied subbands which allows a dynamic assignment of different wideband uplink configurations or, in other words, the use of different wideband subband sizes.

Figure 11:
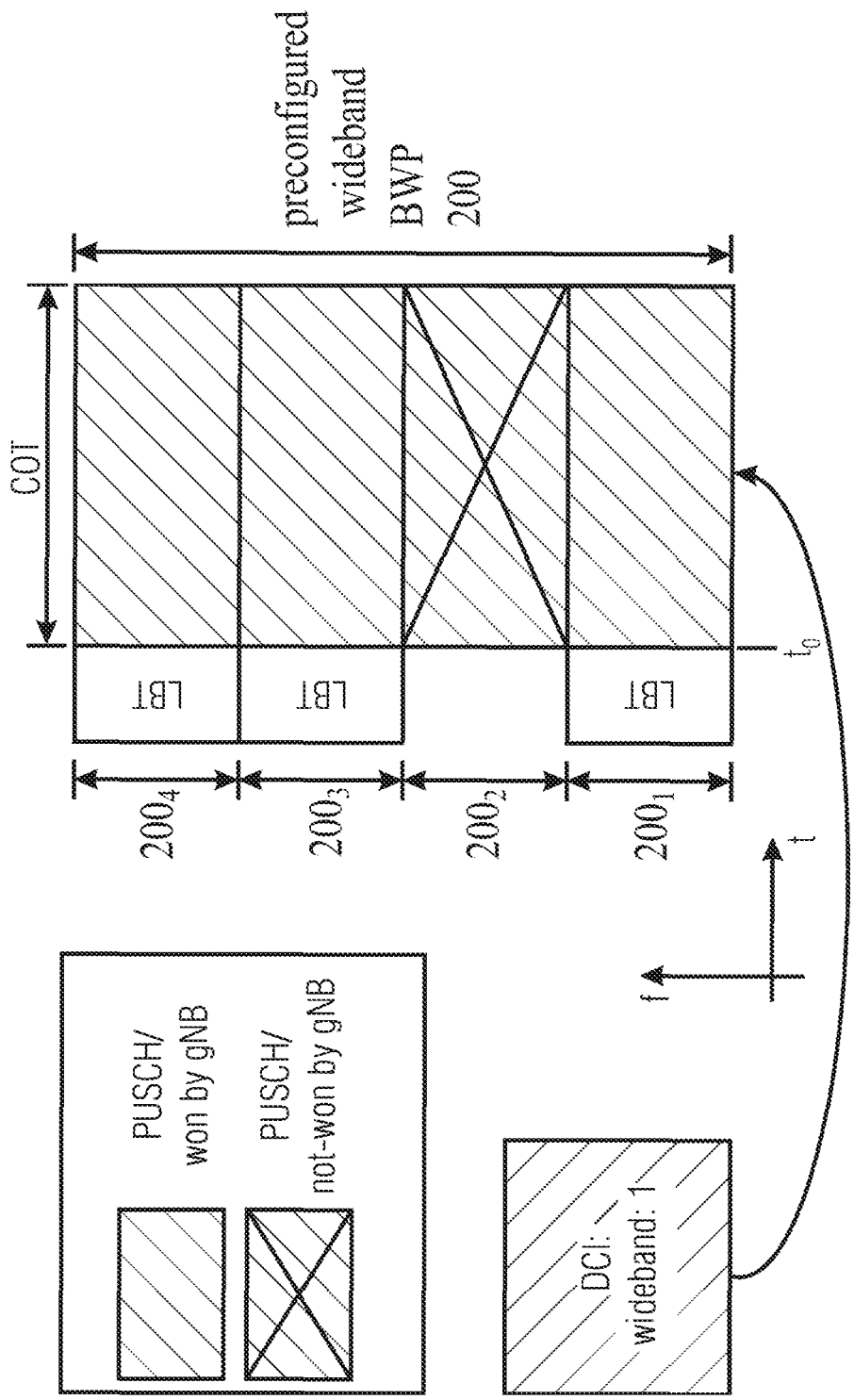
FIG. 11 illustrates an embodiment of a third aspect of the present invention, more specifically a wideband configuration in RRC and the corresponding DCI signaling or indication.

FIG. 11 illustrates an embodiment of the third aspect of the present invention, more specifically a wideband configuration in RRC and the corresponding DCI signaling or indication. FIG. 11 shows in the right hand part the BWP 200 which defines the preconfigured wideband in a way as described in the embodiments above. Naturally, also other configurations are possible. In the situation depicted in FIG. 11 it is assumed that the gNB, for the wideband operation, performed the LBT procedure which yielded that subbands $200_1$, $200_3$ and $200_4$ are available or non-occupied, while subband $200_2$ is not available, i.e., is busy. Thus, subbands $200_1$, $200_3$ and $200_4$ are also referred to as subbands won by the gNB while subband $200_2$ is not won by the gNB.

The gNB may use an RRC signaling, for example a dedicated signaling to a certain UE or to a certain group of UEs, or a broadcasted RRC signaling including the possible wideband configurations to be used for an uplink transmission from the UE towards the gNB during the gNB initiated COT. The RRC signaling, in accordance with embodiments, may indicate the respective configurations as follows:

Wideband-PDSCH-Config::=SEQUENCE {
Wideband-PDSCH-Config-ID INTEGER (1 . . . max_configs),
Configured-Subbands SEQUENCE (SIZE (1 . . . max_subbands))
OF INTEGER (1 . . . max_nr_bands)
}

Wideband-PDSCH-Config-ID is an integer value between 1 and a maximum number of configurations. The ID indicates a certain wideband configuration among a plurality or a sequence of configurations signaled by the RRC signaling. For each sequence, besides the actual ID, as indicated by a wideband-PDSCH-Config-ID, also the configured subbands are indicated by Configured_Subbands which is a sequence of length 1 to max_subbands, where max_subbands is the maximum number of subbands allowed to be used for wideband operation, indicating the subband-IDs (1 . . . max_nr_bands) to be used where max_nr_bands is the total number of subbands.

During the actual wideband configuration, the gNB may signal to the UE an assignment or grant of uplink resources using layer 1, L1, signaling, for example by sending a DCI in the PDSCH. The DCI, besides scheduling the wideband PDSCH assignment by indicating the slot timing where the PDSCH occurs, i.e., a downlink transmission from the gNB to the UE occurs, also indicates the wideband configuration to be used for the uplink from the UE towards the gNB. In addition, the modulation and coding scheme as well as a new data indicator may be signaled.

FIG. 11 schematically illustrates a situation in which the gNB has won, as mentioned above, three of the subbands available for the wideband communication, and a DCI is signaled towards the UE indicating, inter alia, the wideband configuration 1 telling the UE that subbands $200_1$, $200_3$ and $200_4$ may be used for an uplink transmission towards the gNB as scheduled by the DCI.

It is noted that the embodiments for the third aspect have been described primarily with a situation in which the gNB initiates the wideband operation, however, the principles apply equally for a UE initiated wideband operation and in such a case, the gNB includes several wideband configurations for a downlink transmission during the UE-initiated COT, and the actual wideband configuration to be used for the downlink is signaled in a UCI. Further, the embodiments are not limited to a communication using, for example, the Uu interface between a base station and a user device, rather, the principles may also be applied to a sidelink communication, like a D2D, V2V, V2X communication. In this case, the UEs may be initially configured with the plurality of available wideband configurations, and during the actual wideband operation, the transmitting UE signals to the receiving UE the actual wideband configuration to be used, dependent on the available or free subbands using, for example, the sidelink control information, SCI.

$4^{th}$ ASPECT—Transmission Preparation, Like PUSCH or PDSCH

In accordance with this aspect, embodiments of the present invention provide for an approach in accordance with which a receiver in a wideband operation stores a plurality of wideband configurations to be used and receives from the transmitter information about the actual wideband configuration to be applied as well as a grant for a transmission from the receiver to the transmitter. The receiver prepares a plurality of transmissions, and each transmission includes a different number of subbands or a different pattern of subbands. Responsive to the LBT yielding the available/non-available or occupied/non-occupied subbands from the overall wideband configuration, an appropriate transmission is selected from the prepared transmissions, e.g., a transmission that fulfills one or more certain criteria or that matches the LBT pattern best. For example, when considering a UE that received a DCI with a PUSCH grant (see for example FIG. 11), the UE may prepare several PUSCH transmissions for a fixed number of predefined subsets of subbands in the wideband configuration or in a set of wideband configurations. Based on an LBT outcome as performed by the UE, the UE may select the PUSCH transmission which provides for a data rate exceeding a predefined threshold, and/or provides the largest transport block size fitting the LBT pattern, and/or provides the highest number of subbands fitting the LBT pattern, and/or provides a channel quality exceeding a predefined threshold, and/or has a certain priority with regard to the available or associated subband configuration.

FIG. 12 illustrates an embodiment in which a UE prepares three different PUSCHs sizes and chooses one based on the LBT outcome. In FIG. 12 (a) the wideband configuration to be applied, in general, for a wideband operation is indicated which, in the example illustrated is a wideband configuration over a BWP 200 spanning three subbands $200_1$ to $200_3$. The UE may receive from the gNB an indication that the wideband configuration to be used for a wideband operation among the gNB and the UE is the configuration as depicted in FIG. 12 (a). Responsive to this information the UE, as indicated in FIG. 12 (b) creates a number of PUSCH transmissions, in the depicted example three PUSCH transmissions $206_1$ to $206_3$ of which the first PUSCH $206_1$ uses all subbands $200_1$ to $200_3$, the second PUSCH $206_2$ only uses subbands $200_2$ and $200_3$ but not subband $200_1$, and PUSCH $206_3$ uses subbands $200_1$, $200_2$ but not subband $200_3$. Responsive to the UE performing the LBT, as is indicated between FIG. 12 (b) and FIG. 12 (c), the UE selects among the transmission $206_1$ to $206_3$ the one which, for example, matches best the outcome of the LBT algorithm. The PHY layer of the UE may report to the MAC layer of the same UE which PUSCH has been selected by, e.g., reporting the transport block size or the PUSCH-ID which has been selected. In the depicted example the LBT may indicate that among the available subbands $200_1$ to $200_3$ of the original wideband configuration 200 (FIG. 12 (a)) only subbands $200_2$ and $200_3$ are available, so that the UE, for the actual uplink transmission to the gNB selects the prepared transmission $206_2$ as indicated in FIG. 12 (c).

In accordance with other embodiments, for a wideband configuration as indicated in FIG. 12 (a), the UE may, for example, prepare a first PUSCH using one subband, a second PUSCH using two subbands and third PUSCH using three subbands, i.e., a maximum number of subbands, and the UE may then select, responsive to the LBT results, the PUSCH for the actual transmission that fits the LBT results best.

The wideband configuration as shown in FIG. 12 (a), may be a wideband configuration signaled to the UE by the gNB, or the UE may be configured with a plurality of available wideband configurations having different numbers of subbands of different sizes, and receives from the gNB an indication which of the wideband configurations pre-stored at the UE are used for wideband operation. The signaling of the wideband configuration to the UE may be an RRC signaling, either a dedicated signaling for the UE(s) to which the wideband operation applies or it may be broadcasted by the gNB to all UEs within its coverage. The RRC signaling may be as follows:

Wideband-PUSCH-Preparation-Config::=
  SEQUENCE {
Configured-Subbands SEQUENCE (SIZE (1 . . . max_subbands))
OF INTEGER (1 . . . max_nr_bands)
}

A number, sequence, of subbands may be signaled by Configured_Subbands which is a sequence of length 1 to max_subbands, where max_subbands is the maximum number of subbands allowed to be used for wideband operation, indicating the subband-IDs (1 . . . max_nr_bands) to be used where max_nr_bands is the total number of subbands.

Another RRC signaling may be as follows:
Wideband-PUSCH-Preparation-Config::=
  SEQUENCE{
Configured-Subbands INTEGER (1 . . . max_nr_bands)
}

A number, sequence, of subbands may be signaled by Configured_Subbands which is a number between 1 and max_subbands, where max_subbands is the maximum number of subbands allowed or (pre-) configured to be used for wideband operation.

In accordance with other embodiments of the fourth aspect, the UE may prepare the PUSCH transmissions differently so as to handle LBT-failures on one or more of the subbands indicated in the wideband configuration available at the UE. For example, in accordance with embodiments, the UE may prepare only the shortest PUSCH length, for example only one subband, and only send the smallest size repeated on the other subbands, if available, so as to keep the bands busy to avoid a new mandatory LBT, for example in a way as depicted in FIG. 10 (c) and FIG. 10 (d). The UE may indicate, for example using a UL signaling, the number of used subbands, for example in a way as described above by providing respective bits or bit combinations in a UCI so as to indicate the actual subbands used for the uplink communication. For example, the bit combinations indicated in the tables shown above with reference to the third aspect may be used. The UE may also indicate that the PUSCH is repeated in the PUCCH. In accordance with other embodiments, the UE may generate multiple possible subband sizes and puncture the nearest size to the available number of subbands, thereby reducing the size by puncturing. For example, assuming that the wideband configuration has four subbands for which only two are non-occupied and the closest transmission prepared uses three subbands, the transmission may be punctured so as to remove one occupied subband from the transmission. The UE may indicate the number of used subbands, e.g., using the bit combinations indicated in the tables shown above with reference to the third aspect, as well as the puncturing using the PUCCH.

It is noted that the embodiments for the fourth aspect have been described primarily for a gNB that initiates the wideband operation, however, the principles apply equally for a UE initiated wideband operation. Further, the embodiments are not limited to a communication using, for example, the Uu interface between a base station and a user device, rather, the principles may also be applied to a sidelink communication, like a D2D, V2V, V2X communication.

$5^{th}$ ASPECT—Control Channel Monitoring Enabling for not-Won Subbands

In accordance with this aspect, embodiments of the present invention allow a UE or gNB to also monitor non-won subbands, i.e., subbands which are indicated by the LBT procedure to be busy or occupied. In accordance with embodiments, for example, if a UE is switching PDCCH monitoring to subbands in which no gNB-COT is detected or signaled within the configured wideband configuration, like the configured BWP, the UE may be configured by the network to also monitor such subbands, i.e., subbands judged by the LBT to be busy, anyway. This aspect may be a UE capability which is indicated to the gNB during, e.g., connection setup. The advantage of this aspect is that a UE operating in this way is in a situation to receive a transmission from the gNB immediately after a subband has been regained, for example in accordance with the first aspect described above, without the need of being explicitly made aware of the new subband. The UE is already prepared to process transmissions on the regained subband and does not require any indication from the gNB to do so. Thus, other than in the embodiments of the first aspect, no signaling that a subband has been regained is needed. This approach is advantageous as it allows that also the start of the COT of the regained subband may be used for the wideband operation.

It is noted that the embodiments for the fifth aspect have been described primarily for the communication among the gNB and the UE, however, the invention is not limited to a communication using, for example, the Uu interface between a base station and a user device, rather, the principles may also be applied to a sidelink communication, like a D2D, V2V, V2X communication.

6$^{th}$ ASPECT—Appending of Punctured Parts

In accordance with this aspect, embodiments of the present invention allow for a transmission of the data which, initially, was associated with a subband which, however, because the subband was occupied by other systems, was not used for the wideband operation. For example, in case a subband of a wideband transmission, as defined by a wideband configuration (see for example FIG. 12 (a)), cannot be won, i.e., is not available for the wideband operation, the transmitter, which may be the UE or the gNB, may decide to puncture the parts of the transmission to be transmitted in the non-won subband. This may degrade the decoding performance of the transmission at the receiver. To void such degradation, in accordance with embodiments of the sixth aspect, the transmitter, like the UE or the gNB, may append the non-transmitted part of the transmission on one or more of the subbands from the wideband configuration which, responsive to the LBT process, has been judged to be available for a transmission, i.e., is non-occupied or free.

Figures 13A, 13B:
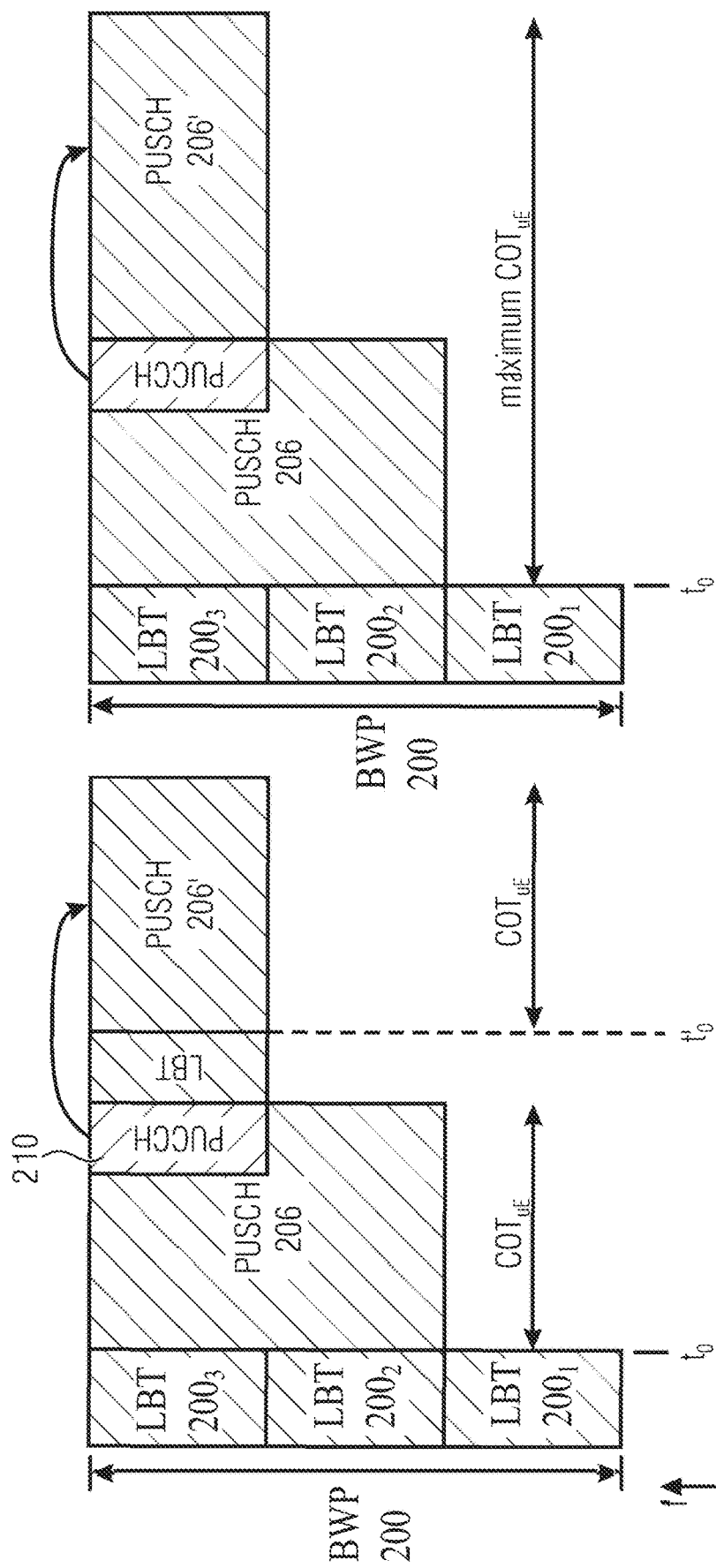
FIGS. 13a-b illustrates embodiments for appending punctured parts of a transmission to one or more initially won subbands.

FIG. 13 illustrates embodiments for appending punctured parts of a transmission. FIG. 13 (a) shows an embodiment in accordance with which initially non-transmitted parts of a transmission are appended by initiating a new COT by using the LBT process. FIG. 13 (a) shows a wideband configuration using three subbands $200_1$ to $200_3$ for a UE-initiated wideband communication, for example, towards a gNB or another UE, when applying the sidelink communication. The LBT process performed at the UE yields that among the subbands subband $200_1$ is occupied by another system, i.e., is not available for the transmission while subbands $200_2$ and $200_3$ are free or non-occupied. Thus, following the LBT process, the original transmission is punctured, namely the part of the transmission associated with the occupied subband $200_1$ is removed, and only the part of the transmission associated with the available subbands $200_2$ and $200_3$, namely PUSCH 206 is transmitted in the initial transmission $COT_{UE}$. The UE, which performed the puncturing, sends, during the PUSCH 206 a PUCCH 210 so as to inform the receiver, namely the base station or other UE, that the transmission 206 is only a part of the transmission, i.e., has been punctured and that in a subsequent transmission on the subband $200_3$ the remaining or punctured part 206' of the original transmission is transmitted during a following transmission time $COT_{UE}$. In the example of FIG. 13 (a), for appending the punctured part 206' of the original transmission a new COT is initiated by performing a further LBT process on one of the subbands which, initially, were found non-occupied. In the example of FIG. 13 (a), the further LBT process is performed in the subband $200_3$ using, for example, CAT-4 or CAT-2 LBT and in case the subband $200_3$ is still available, i.e., is not busy or occupied, the transmitter, like the UE transmits the lost part 206' to the receiver. In case subband $200_3$ is not available, i.e., became busy by another system, the lost part may be dropped.

FIG. 13 (b) illustrates a further embodiment of this aspect in which no new COT needs to be created, i.e., there is no further LBT to be carried out, rather, the initial COT is prolonged. For example, the UE or gNB may consider the case of prolonging the COT already during channel access for the transmission itself, and it may chose the CWS for the LBT such that the maximum allowed COT duration is enough to append some part of the original transmission. In case the transmitter, initially, obtains all subbands for the wideband transmission, i.e., there are no occupied subbands in the wideband configuration to be used, the maximum COT time is not used but only the time for actually transmitting the transmission 206. However, in case one or more of the subbands are lost, the UE/gNB may use the additional COT duration on one or more of the subbands which have been judged by the LBT process to be free for the transmission of the punctured part 206'. In FIG. 13 (b), the UE, in the initial LBT process applies the maximum COT, however, for the original transmission 206, only first part of the maximum COT is needed, so that in a situation as explained above with FIG. 13 (a), in which the subband $200_1$ is not available, the transmission that was associated with this subband can be appended to the available subbands $200_2$ or $200_3$ in the second part of the COT.

It is noted that the embodiments for the sixth aspect have been described primarily for a UE that initiates the wideband operation, however, the principles apply equally for a gNB initiated wideband operation. Further, the embodiments are not limited to a communication using, for example, the Uu interface between a base station and a user device, rather, the principles may also be applied to a sidelink communication, like a D2D, V2V, V2X communication.

7$^{th}$ ASPECT—Separate Subcarrier Spacing (SCS) Fast Control without LBT

In accordance with this aspect, embodiments of the present invention allow transmitting certain information directly after an actual transmission without applying an extra LBT, for example, feedback information or the like. Embodiments of the seventh aspect may be used both for wideband operation and non-wideband operation, i.e., for transmissions performing LBT so as to see whether one or more subbands are available for a transmission or non-available due to their occupancy by another coexisting system.

FIG. 14 illustrates embodiments of the seventh aspect in accordance with an operation for transmitting information on a single subband $200_1$ that may be shared among different communication systems.

FIG. 14 (a) shows an embodiment for an uplink transmission from a UE to a gNB. Initially an LBT is performed by the UE so as to determine whether subband $200_1$ is free or non-occupied. In case the subband $200_1$ is free, the UE performs an uplink transmission PUSCH 206 following the LBT process at time $t_0$ to time $t_1$ using a subcarrier spacing of, for example, 15 KHz. After the uplink communication and after a certain gap from time $t_1$ to time $t_2$, beginning with time $t_2$, the UE receives in a further part a control message PDCCH 202 from the gNB with a subcarrier spacing of 60 KHz.

FIG. 14 (b) shows a similar scenario as described with reference 14 (a), however for a downlink communication from a gNB to a UE during the time $t_0$ to $t_1$ and for an uplink transmission from the UE to the gNB, starting at time $t_2$.

The same configuration may be used for a sidelink communication among user devices so that the transmitting UE initially transmits with a first subcarrier spacing and receives from the receiving UE a confirmation or the like using a second, higher subcarrier spacing.

The embodiments described above with reference to FIG. 14 allow implementing, e.g., a HARQ feedback process similar to the one in IEEE 802.11, also in an NR-U environment using a single subband communication or a wideband communication without the need for an extra LBT as the direct sending of the feedback after the actual transmission is enabled. In IEEE 802.11 this works because the HARQ transmission itself is done immediately following the initial transmission and is very short. For implementing such an approach in accordance with NR-U, the transmission duration during the COT of the subband $200_1$ is preconfigured such that there are separate subcarrier spacings, one for the transmission and a different one, higher one, for the immediate control transmission, optionally provided with a small switching gap to allow the UE to adapt for the reception of signals with the different subcarrier spacing. This allows sending, for example, HARQ feedback from the UE to the gNB or from the gNB to the UE or among UEs at the end of the actual transmission still within the COT thereby avoiding the need to perform a new LBT. Since the OFDM symbols of higher SCS are shorter in time the transmission of the control data is also faster.

It is noted that the embodiments for the seventh aspect have been described primarily for a communication among the gNB and the UE, however, the invention is not limited to a communication using, for example, the Uu interface between a base station and a user device, rather, the principles may also be applied to a sidelink communication, like a D2D, V2V, V2X communication.

General

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources.

With regard to the above-described embodiments of the various aspects of the present invention, it is noted that they have been described in an environment in which a certain BWP is used having four subbands of the same bandwidth. Naturally, the invention is not limited to such a BWP, rather narrower or broader BWPs including more or less subbands of the same bandwidth or of different bandwidths may be employed.

Embodiments of the present invention have been described in detail above, and the respective embodiments and aspects may be implemented individually or two or more of the embodiments or aspects may be implemented in combination.

Embodiments of the present invention have been described in detail above with reference to a sidelink communication using the PC5 interface. However, the present invention is not limited to the use of the PC5 interface. Any other interface allowing for a direct communication among one or more UEs may be employed, e.g., interfaces according to the IEEE 802.11p standard, the IEEE 802.15.4 standard (Zigbee), and others.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 15:
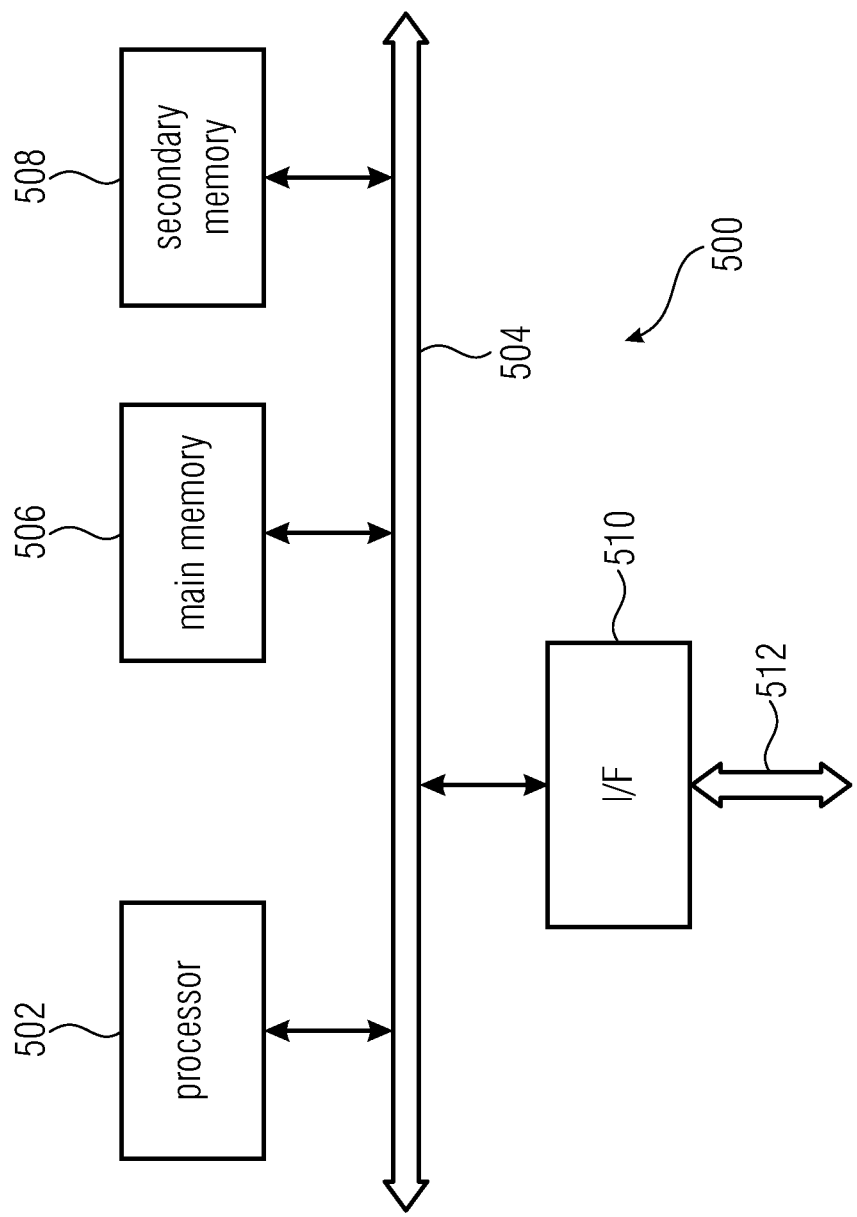
FIG. 15 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 15 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus, comprising:
    an antenna circuit; and
    a processing circuit operatively connected to the antenna circuit,
    wherein, for a wideband communication with at least one transceiver in a the wireless communication system using one or more subbands of a predefined wideband, the processing circuit is arranged to:
    perform an initial Listen-Before-Talk (LBT) for each subband of the predefined wideband so as to determine from the predefined wideband at least one initially non-occupied subband on which the wideband communication is allowed during a Channel Occupancy Time (COT), and
    during the COT, transmit to and/or receive from the transceiver using the at least one initially non-occupied sub-band, and
    wherein the processing circuit is arranged to, during the COT, when the initial LBT indicates that at least one of the subbands is initially occupied:
    perform a further LBT for the at least one initially occupied subband so as to determine that the at least one initially occupied subband is no longer occupied, and
    transmit to and/or receive from the transceiver using, in addition to the at least one initially non-occupied subband, the at least one no longer occupied subband,
    wherein the processing circuit is arranged to:
        continue performing the LBT on the at least one initially occupied subband while transmitting/receiving using the at least one initially non-occupied subband,
        signal to the at least one transceiver that the at least one no longer occupied subband is available, and
        provide a control message to the at least one transceiver, wherein the control message indicates the at least one no longer occupied subband.

2. The apparatus of claim 1, wherein a transmission time of the at least one no longer occupied subband is substantially aligned with an ending of the Channel Occupancy Time.

3. The apparatus of claim 1, wherein the processing circuit is arranged to signal to the at least one transceiver the at least one no longer occupied subband using the at least one initially non-occupied subband and/or the at least one no longer occupied subband, wherein the control message indicates the at least one no longer occupied subband.

4. The apparatus of claim 1, wherein the processing circuit provides the control message using RRC signaling, or L1 signaling, or over the top signaling by the core network.

5. The apparatus of claim 1, wherein the control message comprises a subband field, wherein the subband field indicates which of the subbands of the predefined wideband are available.

6. The apparatus of claim 5, wherein the processing circuit indicates which of the subbands of the predefined wideband are available by setting respective bits of the subband field associated with the subbands to a first value or to a second value, wherein the first value indicates a non-occupied state, and wherein the second value indicates an occupied state.

7. The apparatus of claim 1, wherein
    wherein the apparatus is a base station of the wireless communication system, wherein the processing circuit is arranged to signal to at least one user device of the wireless communication system the at least one no longer occupied subband in a Physical Downlink Control Channel (PDCCH), wherein the PDCCH comprises Downlink Control Information, or wherein the apparatus is a user device of the wireless communication system, wherein the processing circuit is arranged to signal to at least one base station of the wireless communication system the at least one no longer occupied subband in a Physical Uplink Control Channel (PUCCH), wherein the PUCCH comprises Uplink Control Information, or the apparatus is a user device of the wireless communication system, wherein the processing circuit is arranged to signal to at least one other user device of the wireless communication system the at least one no longer occupied subband in a Physical Sidelink Control Channel (PSCCH), wherein the PSCCH comprises Sidelink Control Information.

8. The apparatus of claim 1, wherein the signaling indicates a frequency and/or bandwidth for the at least one no longer occupied subband.

9. The apparatus of claim 1, wherein the processing circuit is arranged to wait for a first time before transmitting using the at least one no longer occupied subband.

10. The apparatus of claim 9, further comprising a timer wherein the timer sets the first time after which the apparatus transmits on the at least one no longer occupied subband, wherein the timer starts directly after an indication of an existence of the at least one no longer occupied subband.

11. The apparatus of claim 9, wherein the processing circuit is arranged to wait for preparing a transmission on the at least one no longer occupied subband.

12. The apparatus of claim 9, wherein the processing circuit is arranged to perform a rate-matching procedure.

13. The apparatus of claim 1, wherein the processing circuit is arranged to transmit a reservation signaling at the beginning of a transmission time associated with the at least one no longer occupied subband so as to reserve the subband.

14. The apparatus of claim 1, wherein the apparatus comprises a user equipment, wherein the user equipment (UE) comprises at least one a mobile terminal, or stationary terminal, or cellular Internet-of-Things user equipment (IoT-UE), or vehicular UE, or vehicular group leader UE, an IoT or narrowband IoT, device, or a ground based vehicle, or an aerial vehicle, or a drone, or a moving base station, or road side unit, or a building, or any other item or device provided with network connectivity enabling the item/device to communicate using the wireless communication network, or wherein the apparatus comprises a base station, wherein the base station comprises at least one of a macro cell base station, or a small cell base station, or a central unit of a base station, or a distributed unit of a base station, or a road side unit, or a UE, or a group leader, or a relay, or a remote radio head, or an Access and Mobility Management Function (AMF), or a Session Management Function, or a core network entity, or mobile edge computing entity, or a network slice, or any transmission/reception point enabling an item or a device to communicate using the wireless communication network, the item or device being provided with network connectivity to communicate using the wireless communication network.

15. The apparatus of claim 1, wherein a transmission time of the at least one no longer occupied subband is not-aligned with an ending of the Channel Occupancy Time.

16. A method for a wideband communication in a wireless communication system, the method comprising:

for a wideband communication with at least one transceiver in the wireless communication system using at least one subband of a predefined wideband, performing an initial Listen-Before-Talk (LBT) for each subband of the predefined wideband so as to determine from the predefined wideband at least one initially non-occupied subband on which the wideband communication is allowed during a Channel Occupancy Time (COT), and during the COT, transmitting to and/or receiving from the transceiver using the at least one initially non-occupied sub-band;

during the COT, when the initial LBT indicates that at least one of the subbands is initially are occupied;

performing a further LBT for the at least one initially occupied subband so as to determine that the at least one initially occupied subband is no longer occupied, and transmitting to and/or receive from the transceiver using, in addition to the at least one initially non-occupied subband, the at least one no longer occupied subband;

continuing to perform the LBT on the at least one initially occupied subband while transmitting/receiving using the at least one initially non-occupied subband;

signaling to the at least transceiver that the at least one no longer occupied subband is available;

providing a control message to the at least one transceiver, wherein the control message indicates the at least one no longer occupied subband.

17. A non-transitory computer program product comprising a computer readable medium storing instructions which, when executed on a computer, performs the method of claim 16.

18. The method of claim 16, further comprising signaling to the at least one transceiver the at least one no longer occupied subband using the at least one initially non-occupied subband and/or the at least one no longer occupied subband, wherein the control message indicates the at least one no longer occupied subband.

19. The method of claim 16, further comprising providing the control message using RRC signaling, or L1 signaling, or over the top signaling by the core network.

20. The method of claim 16, wherein the control message comprises a subband field indicating which of the subbands of the predefined wideband are available.

21. The method of claim 20, further comprising indicating which of the subbands of the predefined wideband are available by setting respective bits of the subband field associated with the subbands to a first value or to a second value, wherein the first value indicates a non-occupied state, and wherein the second value indicates an occupied state.

* * * * *